(12) United States Patent
Kalevo et al.

(10) Patent No.: US 11,202,083 B2
(45) Date of Patent: Dec. 14, 2021

(54) ENCODER, DECODER AND METHOD EMPLOYING PALETTE UTILIZATION AND COMPRESSION

(71) Applicant: GURULOGIC MICROSYSTEMS OY, Turku (FI)

(72) Inventors: Ossi Kalevo, Akaa (FI); Tuomas Karkkainen, Turku (FI)

(73) Assignee: GURULOGIC MICROSYSTEMS OY, Turku (FI)

( * ) Notice: Subject to any disclaimer, the term of this patent is extended or adjusted under 35 U.S.C. 154(b) by 13 days.

(21) Appl. No.: 15/736,261

(22) PCT Filed: Jun. 20, 2016

(86) PCT No.: PCT/EP2016/025065
§ 371 (c)(1),
(2) Date: Dec. 13, 2017

(87) PCT Pub. No.: WO2016/202470
PCT Pub. Date: Dec. 22, 2016

(65) Prior Publication Data
US 2018/0160129 A1    Jun. 7, 2018

(30) Foreign Application Priority Data
Jun. 18, 2015    (GB) ..................... 1510768

(51) Int. Cl.
*H04N 19/186*    (2014.01)
*H04N 19/176*    (2014.01)
(Continued)

(52) U.S. Cl.
CPC ............. *H04N 19/186* (2014.11); *G06T 9/00* (2013.01); *H04N 19/105* (2014.11);
(Continued)

(58) Field of Classification Search
CPC .. H04N 19/147; H04N 19/105; H04N 19/176; H04N 19/186; H04N 19/19;
(Continued)

(56) References Cited

U.S. PATENT DOCUMENTS 8,675,731 B2    3/2014    Kalevo et al.
8,754,791 B1    6/2014    Kalevo
(Continued)

FOREIGN PATENT DOCUMENTS

EP    2 744 213 A1    6/2014
GB    2 371 730 A    7/2002
(Continued)

OTHER PUBLICATIONS

Joshi et al. "Screen Content Coding Test Model 2 Encoder Description (SCM 2)" 18. JCT-VC Meeting; Jun. 30, 2014-Jul. 9, 2014; Sapporo; XP030116701) (Year: 2014).*
(Continued)

*Primary Examiner* — Sath V Perungavoor
*Assistant Examiner* — Tyler B Edwards
(74) *Attorney, Agent, or Firm* — Foley & Lardner LLP

(57) ABSTRACT

A method of encoding input data to generate corresponding encoded data is provided. The method includes encoding the input data into a plurality of symbols in the encoded data, wherein the plurality of symbols represent data as defined by a plurality of palettes indicated and/or included in the encoded data. The method further includes determining mutually different palettes to be used for encoding mutually different parts of the input data, and using the mutually different palettes for encoding the mutually different parts of the input data. Moreover, the method also includes including, within the encoded data, information associating the mutually different palettes with their respective parts of the input data encoded into the encoded data, wherein the
(Continued)

information includes palette selection indices for referencing the mutually different palettes on a block-by-block basis.

20 Claims, 18 Drawing Sheets

(51) Int. Cl.
*H04N 19/147* (2014.01)
*H04N 19/196* (2014.01)
*H04N 19/105* (2014.01)
*G06T 9/00* (2006.01)
*H04N 19/593* (2014.01)
*H04N 19/19* (2014.01)

(52) U.S. Cl.
CPC ......... *H04N 19/147* (2014.11); *H04N 19/176* (2014.11); *H04N 19/197* (2014.11); *H04N 19/593* (2014.11); *H04N 19/19* (2014.11)

(58) Field of Classification Search
CPC .... H04N 19/197; H04N 19/593; H04N 19/13; H04N 19/17; H04N 19/70; H04N 19/90; G06T 9/00; H03M 7/6076
See application file for complete search history.

(56) References Cited

U.S. PATENT DOCUMENTS

| | | | |
|---|---|---|---|
| 2007/0053426 A1 | 3/2007 | Lee et al. | |
| 2014/0044191 A1 | 2/2014 | Kalevo et al. | |
| 2014/0147040 A1 | 5/2014 | Tanaka et al. | |
| 2014/0247167 A1 | 9/2014 | Kalevo | |
| 2015/0016501 A1* | 1/2015 | Guo | H04N 19/93 375/240.02 |
| 2015/0110181 A1 | 4/2015 | Saxena et al. | |

FOREIGN PATENT DOCUMENTS

| | | |
|---|---|---|
| GB | 2509055 A | 6/2014 |
| GB | 2528460 A | 1/2016 |
| WO | 2007/029945 A1 | 3/2007 |
| WO | 2014/131517 A1 | 9/2014 |

OTHER PUBLICATIONS

Xiu et al. "Palette-Based Coding in the Screen Content Coding Extension of the HEVC Standard," 2015 Data Compression Conference, Apr. 1, 2015 (Apr. 1, 2015), pp. 253-262, XP055281 837, DOI: 10.1109/DCC.2015.79, ISBN: 978-1-4799-8430-5 (Year: 2015).*
Great Britain Examination Report, dated May 18, 2018, issued in corresponding Great Britain Application No. GB1510768.3, 4 pages.
Rajan Joshi et al., "Screen content coding test model 2 (SCM 2)", Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4 2-14, Document: JCTVC-R1014, pp. 1-10.
Xiaoyu Xiu et al., "Palette-based Coding in the Screen Content Coding Extension of the HEVC Standard", 2015 Data Compression Conference, IEEE Computer Society, pp. 253-262.
K. McCann et al., "High Efficiency Video Coding (HEVC) Text Model 16 (HM 16) Encoder Description", Joint Collaborative Team on video Coding (JCT-VC) of ITU-T SG16 WP3 and ISO/IEC JTC1/SC29/WG11, 18th Meeting: Sapporo, JP, Jun. 30-Jul. 7, 2014, Document: JCTVC-R1002.
Combined Search and Examination Report under Sections 17 and 18(3) issued in UK Application No. GB1510768.3 dated Dec. 21, 2015.
Examination Report under Section 18(3) issued in UK Application No. GB1510768.3 dated Apr. 18, 2017.
Notification of Transmittal of The International Search Report and The Written Opinion of the International Searching Authoritiy, or the Declaration issued in International Application No. PCT/EP2016/025065 dated Sep. 21, 2016.
Notification of Transmittal of the International Preliminary Report on Patentability issued in International Application No. PCT/EP2016/025065 dated Sep. 26, 2017.
Written Opinion of the International Preliminary Examining Authority issued in International Application No. PCT/EP2016/025065 dated May 16, 2017.
Rajan Joshi et al., "High Efficiency Video Coding (HEVC) Screen Content Coding: Draft 1," Joint Collaborative Team on Video Coding (JCT-VC) of ITU-T SG 16 W P 3 and ISO/IEC JTC 1/SC 29/WG 11, 18th Meeting: Sapporo, JP, Jun. 30-Jul. 9, 2014, Document: JCTVC-R1005-v3.
Rajan Joshi et al., "High Efficiency Video Codin (HEVC) Screen Content Coding: Draft 1", Joint Collaborative Team on Video Coding (JCT-VC) of ITU-T SG 16 WP3 and ISO/IEC JTC 1/SC 29/WG 11, 18th Meeting: Sapporo, JP, Jun. 30-Jul. 9, 2014, Document JCTVC-R1005, version 1—date Aug. 9, 2014.
Rajan Joshi et al., "High Effiency Video Coding (HEVC) Screen Content Coding: Draft 1", Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, Document: JCTVC-R1005-v2 date Aug. 23, 2014.
Rajan Joshi et al., "Screen content coding test model 2 (SCM2)", Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, Document JCTVC-R1014, Dated Saved: Oct. 16, 2014.
Great Britain Intention to Grant under Section 18(4), dated Jan. 11, 2019, issued in corresponding Great Britan Application No. GB1510768.3, 2 pages.
Great Britain Notification to Grant: Patent Serial No. GB2539488, dated Feb. 26, 2019, 2 pages.

* cited by examiner

|   |   |   |   |   |   |   |   |   |   |
|---|---|---|---|---|---|---|---|---|---|
| 0 | 3 | 3 | 3 | 3 | 3 | 2 | 0 | 1 | 1 |
| 1 | 0 | 2 | 2 | 2 | 2 | 0 | 1 | 1 | 1 |
| 1 | 1 | 0 | 0 | 0 | 0 | 1 | 1 | 1 | 1 |
| 1 | 1 | 1 | 1 | 1 | 1 | 1 | 1 | 1 | 1 |
| 1 | 1 | 1 | 1 | 1 | 1 | 0 | 0 | 181 175 | 157 178 |
| 0 | 0 | 0 | 0 | 0 | 0 | 0 | 0 | 236 195 | 157 178 |
| 0 | 0 | 0 | 0 | 0 | 0 | 0 | 1 | 1 | 1 |
| 1 | 1 | 1 | 1 | 1 | 1 | 2 | 0 | 1 | 1 |

FIG. 4B

| A | 126 | 167 | 167 | 167 | 167 | 167 | 152 | 126 | 236 | 236 |
|---|---|---|---|---|---|---|---|---|---|---|
| B | 70 | 152 | 152 | 152 | 152 | 152 | 138 | 70 | 195 | 195 |
| A | 236 | 126 | 145 | 145 | 145 | 145 | 126 | 236 | 236 | 236 |
| B | 195 | 70 | 168 | 168 | 168 | 168 | 70 | 195 | 195 | 195 |
| A | 236 | 236 | 126 | 126 | 126 | 126 | 236 | 236 | 236 | 236 |
| B | 195 | 195 | 70 | 70 | 70 | 70 | 195 | 195 | 195 | 195 |
| A | 236 | 236 | 236 | 236 | 236 | 236 | 236 | 236 | 236 | 236 |
| B | 195 | 195 | 195 | 195 | 195 | 195 | 195 | 195 | 195 | 195 |
| A | 236 | 236 | 236 | 236 | 236 | 236 | 236 | 236 | 181 | 157 |
| B | 195 | 195 | 195 | 195 | 195 | 195 | 195 | 195 | 175 | 178 |
| A | 126 | 126 | 126 | 126 | 126 | 126 | 236 | 236 | 236 | 157 |
| B | 70 | 70 | 70 | 70 | 70 | 70 | 195 | 195 | 195 | 178 |
| A | 145 | 145 | 145 | 145 | 145 | 145 | 126 | 236 | 236 | 236 |
| B | 168 | 168 | 168 | 168 | 168 | 168 | 70 | 195 | 195 | 195 |
| A | 167 | 167 | 167 | 167 | 167 | 167 | 152 | 126 | 236 | 236 |
| B | 152 | 152 | 152 | 152 | 152 | 152 | 138 | 70 | 195 | 195 |

FIG. 4D

Image (10 x 8)

Image (5 x 4)

Palette selections (10 x 8)

Pixel values for scaled image (5 x 4)

| | | | | | |
|---|---|---|---|---|---|
| A | 164 | 156 | 156 | 160 | 236 |
| B | 122 | 160 | 160 | 118 | 195 |
| A | 236 | 181 | 181 | 236 | 236 |
| B | 195 | 133 | 133 | 195 | 195 |
| A | 181 | 181 | 181 | 236 | 183 |
| B | 133 | 133 | 133 | 195 | 182 |
| A | 156 | 156 | 156 | 160 | 236 |
| B | 160 | 160 | 160 | 118 | 195 |

$$X = \frac{2A + B}{3}$$

| X | 107 | 162 | 162 | 162 | 162 | 162 | 147 | 107 | 222 | 222 |
| X | 222 | 107 | 153 | 153 | 153 | 153 | 107 | 222 | 222 | 222 |
| X | 222 | 222 | 107 | 107 | 107 | 107 | 222 | 222 | 222 | 222 |
| X | 222 | 222 | 222 | 222 | 222 | 222 | 222 | 222 | 222 | 222 |
| X | 222 | 222 | 222 | 222 | 222 | 222 | 222 | 222 | 179 | 164 |
| X | 107 | 107 | 107 | 107 | 107 | 107 | 222 | 222 | 222 | 164 |
| X | 153 | 153 | 153 | 153 | 153 | 153 | 107 | 222 | 222 | 222 |
| X | 162 | 162 | 162 | 162 | 162 | 162 | 147 | 107 | 222 | 222 |

Palette for PSI 16

| I | A | B |
|---|---|---|
| 0 | 236 | 195 |

| I | X |
|---|---|
| 0 | 222 |

Palette for PSI 18

| I | A | B |
|---|---|---|
| 0 | 145 | 168 |
| 1 | 167 | 152 |

| I | X |
|---|---|
| 0 | 153 |
| 1 | 162 |

Palette for PSI 23

| I | A | B |
|---|---|---|
| 0 | 126 | 70 |
| 1 | 236 | 195 |
| 2 | 145 | 168 |
| 3 | 167 | 152 |

| I | X |
|---|---|
| 0 | 107 |
| 1 | 222 |
| 2 | 153 |
| 3 | 162 |

Palette for PSI's 1

| I | A | B |
|---|---|---|
| 0 | 126 | 70 |
| 1 | 236 | 195 |
| 2 | 152 | 138 |

| I | X |
|---|---|
| 0 | 107 |
| 1 | 222 |
| 2 | 147 |

| A | B | C | A | B | C | A | B | C | A | B | C |
|---|---|---|---|---|---|---|---|---|---|---|---|
| 126 | 165 | 60 | 1 | 101 | 205 | 2 | 104 | 203 | 1 | 103 | 205 |
| 234 | 97 | 62 | 127 | 168 | 60 | 126 | 70 | 205 | 124 | 71 | 203 |
| 236 | 98 | 61 | 234 | 98 | 63 | 124 | 167 | 60 | 123 | 165 | 62 |

| A | B | C | A | B | C | A | B | C | A | B | C |
|---|---|---|---|---|---|---|---|---|---|---|---|
| 125 | 166 | 61 | 0 | 102 | 204 | 0 | 102 | 204 | 0 | 102 | 204 |
| 235 | 97 | 61 | 125 | 166 | 61 | 125 | 71 | 204 | 125 | 71 | 204 |
| 235 | 97 | 61 | 235 | 97 | 61 | 125 | 166 | 61 | 125 | 166 | 61 |

Palette
| I | A | B | C |
|---|---|---|---|
| 0 | 235 | 97 | 61 |
| 1 | 125 | 166 | 61 |
| 2 | 125 | 71 | 204 |
| 3 | 0 | 102 | 204 |
FIG. 8A
| 235, 97, 61 | 125, 166, 61 | 125, 71, 204 | 0, 102, 204 |
FIG. 8B
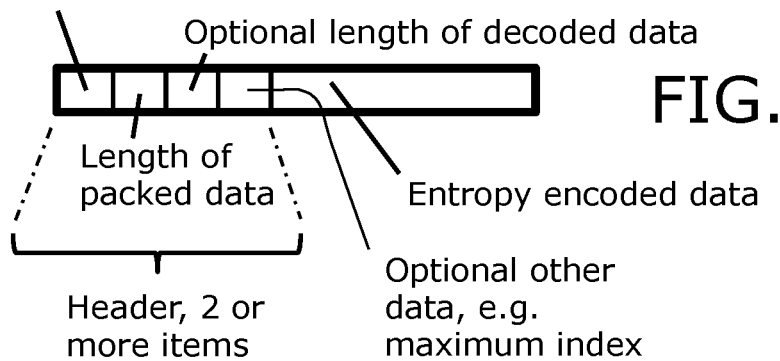
FIG. 8C
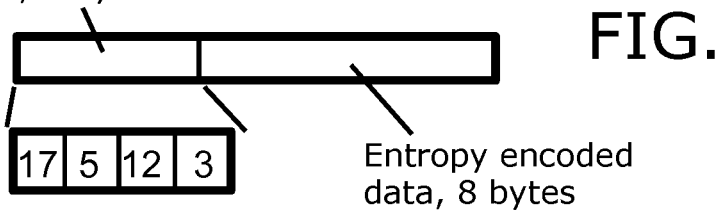
FIG. 8D

| 1 | 3 | 3 | 3 |
|---|---|---|---|
| 0 | 1 | 2 | 2 |
| 0 | 0 | 1 | 1 |

FIG. 9A

| 1 | 3 | 3 | 3 | 0 | 1 | 2 | 2 | 0 | 0 | 1 | 1 |
|---|---|---|---|---|---|---|---|---|---|---|---|
| 01 | 11 | 11 | 11 | 00 | 01 | 10 | 10 | 00 | 00 | 01 | 01 |

FIG. 9B

| 127 | 26 | 5 |
|---|---|---|
| 01111111 | 00011010 | 00000101 |

FIG. 9C

ENCODER, DECODER AND METHOD EMPLOYING PALETTE UTILIZATION AND COMPRESSION

REFERENCE TO RELATED APPLICATIONS

This application is a National Stage of PCT/EP2016/025065, filed Jun. 20, 2016, which claims priority under 35 U.S.C. § 119 to GB Application No. 1510768.3, filed Jun. 18, 2015, all of which are incorporated herein by reference in their entirety.

TECHNICAL FIELD

The present disclosure relates to encoders for encoding input data (D1) to generate corresponding encoded data (E2), and corresponding methods of encoding input data (D1) to generate corresponding encoded data (E2). Moreover, the present disclosure relates to decoders for decoding encoded data (E2) to generate corresponding decoded data (D3), and corresponding methods of decoding encoded data (E2) to generate corresponding decoded data (D3). Furthermore, the present disclosure is concerned with computer program products comprising a non-transitory computer-readable storage medium having computer-readable instructions stored thereon, the computer-readable instructions being executable by a computerized device comprising processing hardware to execute aforesaid methods. Additionally, the present disclosure concerns codecs including at least one aforementioned encoder and at least one aforementioned decoder.

BACKGROUND

Palettes, also known as "look-up-tables" (LUT's) or "color (colour) look-up-tables" (CLUT's), are conventionally used to describe some sort of information in some other form. As an example, in a conventional Graphics Interchange Format (GIF) file, a color (colour) palette is used to describe, for example, 32/64/128/256 different index values that are used to present original information of the GIF file in a lossy or lossless form. Likewise, conventional Portable Network Graphics format (PNG) files also contain palette information. Typically, only one palette is used for a given image file.

Each index value in a GIF file describes, for example, 24-bit Blue-Green-Red (BGR) color (colour) values, in a manner that some specific combinations of 8-bit color (colour) values are used for describing pixel values of the GIF file in red, green and blue channels. If a given color (colour) palette includes 256 index values, 768 bytes (=3× 256 bytes) are used in a GIF file to describe the given color (colour) palette. It will be appreciated here that only a limited number of different 24-bit color (colour) values can be described by using a limited number of different index values.

GIF employs two techniques for rendering more than 256 colors (colours) in a color (colour) image. A first technique involves splitting a given image into partial images, namely into blocks that are then processed as separate images would be, and issuing the partial images their own palettes. The first technique is rather inefficient, because each partial image, for example, has its own header, including information about its size, a format used and a palette used. Moreover, many software applications that are generally able to open GIF images do not understand these partial images correctly. Such software applications either make an animation from the partial images, or open only a first partial image.

A second technique for rendering more than 256 colors (colours) in a color (colour) image involves using transparency information to add more colors (colours), in addition to the palette used. Considerable planning and optimization are required to make the second technique work even fairly efficiently. Moreover, the second technique yields insufficient efficiency when encoding data.

In a published technical document "Palette-based Coding in the Screen Content Coding Extension of the HEVC Standard" (Rajan Joshi et al.), which is hereby incorporated by reference in its entirety, a technical overview of palette-based coding is described, wherein the palette-based coding is susceptible to being adopted into a test model for a screen content coding (SCC) extension of the known High Efficiency Video Coding (HEVC) standard. Key techniques that enable a palette mode to deliver significant coding gains for screen contents are highlighted, including palette table generation, palette table coding, and the coding methods for palette indices and escape colors (colours). Proposed and adopted techniques up to the first version of the working draft of HEVC SCC extension and test model SCM-2.0 are presented. Experimental results are provided to evaluate the performance of the palette mode in the second extension of HEVC.

In a published technical document "Screen content coding test model 2 (SCM 2)" (Rajan Joshi et al.), which is hereby incorporated by reference in its entirety, there is described, from an encoder-side perspective, a HEVC Screen content coding test model 2 (SCM 2), which serves as a tutorial for an encoding model implemented in HM-15.0+RExt-8.0+SCM-2.0 software. The published document has a purpose to share a common understanding of reference encoding methods supported in the HM-15.0+RExt-8.0+SCM-2.0 software, in order to facilitate an assessment of a technical impact of proposed new technologies during standardization processes.

SUMMARY

The present disclosure seeks to provide an improved encoder for encoding input data (D1) to generate corresponding encoded data (E2).

Moreover, the present disclosure seeks to provide an improved decoder for decoding encoded data (E2) to generate corresponding decoded data (D3).

A further aim of the present disclosure is to at least partially overcome at least some of the problems of the prior art, as discussed above.

In a first aspect, embodiments of the present disclosure provide a method of encoding input data (D1) to generate corresponding encoded data (E2), wherein the method includes encoding the input data (D1) into a plurality of symbols in the encoded data (E2), wherein the plurality of symbols represent data as defined by a plurality of palettes indicated and/or included in the encoded data (E2), characterized in that the method further includes:

determining different palettes to be used for encoding different parts of the input data (D1);

using the different palettes for encoding the different parts of the input data (D1); and including, within the encoded data (E2), information associating the different palettes with their respective parts of the input data (D1) encoded into the encoded data (E2), wherein the information includes palette selection indices for referencing the different palettes on an init block-by-init block basis.

The present invention is of advantage in that efficient signalling of the different palettes that have been utilized for the different parts of the input data (D1) on an init block-by-init block basis provides for efficient data compression in the encoded data (E2).

Optionally, in the method, the palette selection indices indicate at least one of:
(a) a given palette that is used for encoding a data block, and a palette delivery method and/or a palette compression method by which the given palette is being delivered and/or compressed;
(b) a pre-defined palette that is used for encoding a data block;
(c) a dynamic palette that is used for encoding a data block;
(d) reserved for future use, to enable addition of at least one of: new palettes, new palette delivery methods, new palette compression methods.

It will be appreciated here, for example, that the phrase "at least one of" includes any one of (a) to (d) for a first example embodiment, alternatively various combinations of a plurality of (a) to (d) for a second example embodiment.

Additionally, optionally, in the method, one of the palette selection indices indicates that no palette is used for a given data block.

Optionally, the method includes reusing or using a given palette for a plurality of parts of the input data (D1) when encoding the input data (D1). In an example, the given palette is optionally an already known or delivered palette.

Optionally, the method includes using the same palette for a plurality of parts of the input data (D1).

Optionally, the method includes employing a Rate Distortion (RD) method to determine whether or not a given palette is suitable for encoding a given part of the input data (D1).

Optionally, in the method, the determining of the different palettes depends upon content and/or type of the input data (D1). Optionally, in this regard, the content and/or the type of the input data (D1) relate to at least one of: color (colour), color (colour) format, data format, video content, audio content, image content, measurement data, genomic data, a statistical parameter of data blocks or data block sizes present in the input data (D1).

Optionally, in the method, the determining of the different palettes depends upon characteristics describing one or more decoders that are to be used for decoding the encoded data (E2).

Optionally, in the method, the determining of the different palettes is performed on an init block-by-init block basis, for at least one of: data blocks present in the input data (D1), data blocks derived from the input data (D1) by combining and/or splitting data blocks present in the input data (D1), groups of data blocks. It will be appreciated here, for example, that the phrase "at least one of" includes any one of listed items for a first example embodiment, alternatively various combinations of a plurality of these listed items for a second example embodiment.

Optionally, the method includes employing change bits on an init block-by-init block basis, to express whether or not a palette used for encoding a given data block is changed with respect to a palette used for encoding a preceding data block.

Optionally, the method includes delivering one or more of the different palettes via the encoded data (E2) in a compressed form. Optionally, in this regard, the method includes compressing the one or more of the different palettes using different compression methods.

Optionally, the method includes delivering one or more of the different palettes via use of delta values relative to a pre-defined or previously-used palette.

Optionally, the method includes compressing data representative of at least one palette into compressed palette data in a lossless manner for inclusion into the encoded data (E2), wherein palette entry values of the at least one palette are provided consecutively within the encoded data (E2).

Throughout the present disclosure, the term "palette entry values" indicates one or more values, for example a single value, alternatively for example a plurality of values, inside a palette entry of a given palette, wherein the given palette includes at least two palette entries. Notably, a palette entry of a given palette may include one or more values, depending on how many channels the given palette has. Moreover, a palette entry may include values from different channels, or several consecutive values form one channel.

In a second aspect, embodiments of the present disclosure provide a method of decoding encoded data (E2) to generate corresponding decoded data (D3), characterized in that the method includes:
determining different palettes that are used for generating different parts of the encoded data (E2) by analyzing information, included within the encoded data (E2), associating the different palettes with their respective parts of the encoded data (E2), wherein the information includes palette selection indices for referencing the different palettes on an init block-by-init block basis; and
employing the different palettes to decode their respective parts of the encoded data (E2) to generate the decoded data (D3).

Optionally, in the method, the palette selection indices indicate at least one of:
(a) a given palette that is used for encoding a data block, and a palette delivery method and/or a palette compression method by which the given palette is being delivered and/or compressed;
(b) a pre-defined palette that is used for encoding a data block;
(c) a dynamic palette that is used for encoding a data block;
(d) reserved for future use, to enable addition of at least one of: new palettes, new palette delivery methods, new palette compression methods.

It will be appreciated here, for example, that the phrase "at least one of" includes any one of (a) to (d) for a first example embodiment, alternatively various combinations of a plurality of (a) to (d) for a second example embodiment.

Additionally, optionally, in the method, one of the palette selection indices indicates that no palette is used for a given data block.

Optionally, the method includes reusing or using a given palette for a plurality of parts of the encoded data (E2) when decoding the encoded data (E2).

Optionally, in the method, the information includes change bits that express whether or not a palette used for generating a given encoded data block is changed with respect to a palette used for generating a preceding encoded data block.

Optionally, the method includes receiving one or more of the different palettes via the encoded data (E2) in a compressed form.

Optionally, the method includes receiving one or more of the different palettes via use of delta values relative to a pre-defined or previously-used palette.

Optionally, the method includes decompressing compressed palette data included in the encoded data (E2) to generate at least one palette, palette entry values of the at least one palette being provided consecutively within the encoded data (E2), wherein the compressed palette data is decompressed in a lossless manner.

In a third aspect, embodiments of the present disclosure provide an encoder for encoding input data (D1) to generate corresponding encoded data (E2), wherein the encoder is operable to encode the input data (D1) into a plurality of symbols in the encoded data (E2), wherein the plurality of symbols represent data as defined by a plurality of palettes indicated and/or included in the encoded data (E2), characterized in that:

the encoder is operable to determine different palettes to be used for encoding different parts of the input data (D1);

the encoder is operable to use the different palettes for encoding the different parts of the input data (D1); and the encoder is operable to include, within the encoded data (E2), information associating the different palettes with their respective parts of the input data (D1) encoded into the encoded data (E2), wherein the information includes palette selection indices for referencing the different palettes on an init block-by-init block basis.

Optionally, in the method, the palette selection indices indicate at least one of:
(a) a given palette that is used for encoding a data block, and a palette delivery method and/or a palette compression method by which the given palette is being delivered and/or compressed;
(b) a pre-defined palette that is used for encoding a data block;
(c) a dynamic palette that is used for encoding a data block;
(d) reserved for future use, to enable addition of at least one of: new palettes, new palette delivery methods, new palette compression methods.

It will be appreciated here, for example, that the phrase "at least one of" includes any one of (a) to (d) for a first example embodiment, alternatively various combinations of a plurality of (a) to (d) for a second example embodiment.

Additionally, optionally, in the method, one of the palette selection indices indicates that no palette is used for a given data block.

Optionally, the encoder is operable to reuse or use a given palette for a plurality of parts of the input data (D1) when encoding the input data (D1).

Optionally, the encoder is operable to employ an RD method to determine whether or not a given palette is suitable for encoding a given part of the input data (D1).

Optionally, the encoder is operable to determine the different palettes depending upon content and/or type of the input data (D1). Optionally, in this regard, the content and/or the type of the input data (D1) relate to at least one of: color (colour), color (colour) format, data format, video content, audio content, image content, measurement data, genomic data, a statistical parameter of data blocks or data block sizes present in the input data (D1).

Optionally, the encoder is operable to determine the different palettes depending upon characteristics describing one or more decoders that are to be used for decoding the encoded data (E2).

Optionally, the encoder is operable to determine the different palettes on an init block-by-init block basis, for at least one of: data blocks present in the input data (D1), data blocks derived from the input data (D1) by combining and/or splitting data blocks present in the input data (D1), groups of data blocks. It will be appreciated here, for example, that the phrase "at least one of" includes any one of listed items for a first example embodiment, alternatively various combinations of a plurality of the listed items for a second example embodiment.

Optionally, the encoder is operable to employ change bits on an init block-by-init block basis, to express whether or not a palette used for encoding a given data block is changed with respect to a palette used for encoding a preceding data block.

Optionally, the encoder is operable to deliver one or more of the different palettes via the encoded data (E2) in a compressed form. Optionally, in this regard, the encoder is operable to compress the one or more of the different palettes using different compression methods.

Optionally, the encoder is operable to deliver one or more of the different palettes via use of delta values relative to a pre-defined or previously-used palette.

Optionally, the encoder is operable to compress data representative of at least one palette into compressed palette data in a lossless manner for inclusion into the encoded data (E2), wherein palette entry values of the at least one palette are provided consecutively within the encoded data (E2).

In a fourth aspect, embodiments of the present disclosure provide a decoder for decoding encoded data (E2) to generate corresponding decoded data (D3), characterized in that:

the decoder is operable to determine different palettes that are used for generating different parts of the encoded data (E2) by analyzing information, included within the encoded data (E2), associating the different palettes with their respective parts of the encoded data (E2), wherein the information includes palette selection indices for referencing the different palettes on an init block-by-init block basis; and the decoder is operable to employ the different palettes to decode their respective parts of the encoded data (E2) to generate the decoded data (D3).

Optionally, in the method, the palette selection indices indicate at least one of:
(a) a given palette that is used for encoding a data block, and a palette delivery method and/or a palette compression method by which the given palette is being delivered and/or compressed;
(b) a pre-defined palette that is used for encoding a data block;
(c) a dynamic palette that is used for encoding a data block;
(d) reserved for future use, to enable addition of at least one of: new palettes, new palette delivery methods, new palette compression methods.

It will be appreciated here, for example, that the phrase "at least one of" includes any one of (a) to (d) for a first example embodiment, alternatively various combinations of a plurality of (a) to (d) for a second example embodiment.

Additionally, optionally, in the method, one of the palette selection indices indicates that no palette is used for a given data block.

Optionally, the decoder is operable to reuse or use a given palette for a plurality of parts of the encoded data (E2) when decoding the encoded data (E2).

Optionally, the information includes change bits that express whether or not a palette used for generating a given encoded data block is changed with respect to a palette used for generating a preceding encoded data block.

Optionally, the decoder is operable to receive one or more of the different palettes via the encoded data (E2) in a compressed form.

Optionally, the decoder is operable to receive one or more of the different palettes via use of delta values relative to a pre-defined or previously-used palette.

Optionally, the decoder is operable to decompress compressed palette data included in the encoded data (E2) to generate at least one palette, palette entry values of the at least one palette being provided consecutively within the encoded data (E2), wherein the compressed palette data is decompressed in a lossless manner.

In a fifth aspect, embodiments of the present disclosure provide a codec including at least one encoder for encoding input data (D1) to generate corresponding encoded data (E2) pursuant to the aforementioned third aspect, and at least one decoder for decoding the encoded data (E2) to generate corresponding decoded data (D3) pursuant to the aforementioned fourth aspect.

In a sixth aspect, embodiments of the present disclosure provide a computer program product comprising a non-transitory computer-readable storage medium having computer-readable instructions stored thereon, the computer-readable instructions being executable by a computerized device comprising processing hardware to execute any of the aforementioned methods pursuant to the aforementioned first or second aspects.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 4A, 4B, 4C, 4D, 4E, and 4F collectively are a schematic illustration of an example of how palettes are determined for a given input data (D1), in accordance with an embodiment of the present disclosure;

FIGS. 5A, 5B and 5C are a group of illustrations of a data or palette including mutually different channels of the data or palette that will be compressed in various ways, wherein:

FIG. 5A is an illustration of an interleaved format, wherein the channels are to be compressed together, in accordance with an embodiment of the present disclosure;

FIG. 5B is an illustration of a planar format, wherein the channels are to be compressed together, in accordance with an embodiment of the present disclosure;

FIG. 5C is an illustration of a planar format, wherein the channels are to be compressed separately, in accordance with an embodiment of the present disclosure;

FIGS. 8A, 8B, 8C and 8D collectively are an illustration of how a three-channel palette is represented, entropy-coded, compressed and inserted into encoded data (E2) and how it is signalled to a corresponding decoder;

FIGS. 9A, 9B and 9C collectively are an illustration of how indices indicative of ordinal numbers of palette entry values can be represented and signalled with few bits.

Figure 1:
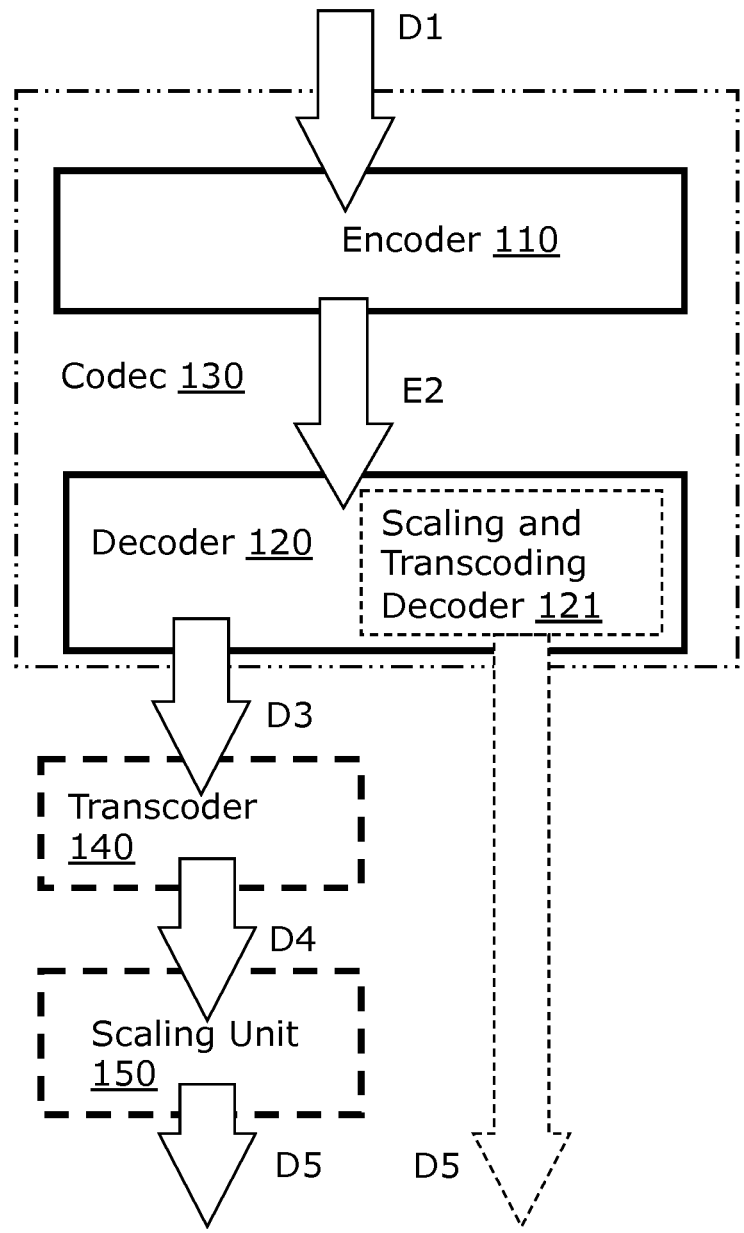
FIG. 1 is a schematic illustration of an encoder for encoding input data (D1) to generate corresponding encoded data (E2) and a decoder for decoding the encoded data (E2) to generate corresponding decoded data (D3), wherein the encoder and the decoder collectively form a codec, in accordance with an embodiment of the present disclosure; optionally, the decoded data (D3) can be either transcoded into transcoded data or scaled, or both.

In the accompanying diagrams, an underlined number is employed to represent an item over which the underlined number is positioned or an item to which the underlined number is adjacent. A non-underlined number relates to an item identified by a line linking the non-underlined number to the item.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, embodiments of the present disclosure provide a method of encoding input data (D1) to generate corresponding encoded data (E2), wherein the method includes encoding the input data (D1) into a plurality of symbols in the encoded data (E2), wherein the plurality of symbols represent data as defined by a plurality of palettes indicated and/or included in the encoded data (E2), characterized in that the method further includes:

determining mutually different palettes to be used for encoding mutually different parts of the input data (D1);

using the mutually different palettes for encoding the mutually different parts of the input data (D1); and including, within the encoded data (E2), information associating the mutually different palettes with their respective parts of the input data (D1) encoded into the encoded data (E2), wherein the information includes palette selection indices for referencing the mutually different palettes on a block-by-block basis.

Optionally, in the method, the palette selection indices indicate at least one of:
(a) a given palette that is used for encoding a data block, and a palette delivery method and/or a palette compression method by which the given palette is being delivered and/or compressed;
(b) a pre-defined palette that is used for encoding a data block;
(c) a dynamic palette that is used for encoding a data block;
(d) reserved for future use, to enable addition of at least one of: new palettes, new palette delivery methods, new palette compression methods.

It will be appreciated here, for example, that the phrase "at least one of" includes any one of (a) to (d) for a first example embodiment, alternatively various combinations of a plurality of (a) to (d) for a second example embodiment.

Notably, reserving a palette selection index for future use, namely in (d), makes it possible to include more palette selection indices. In such a case, a very large set of different palettes can be utilized.

Additionally, optionally, in the method, one of the palette selection indices indicates that no palette is used for a given data block.

Optionally, the method includes reusing or using a given palette for a plurality of parts of the input data (D1) when encoding the input data (D1). In an example, the given palette is optionally an already known or delivered palette.

It will be appreciated here that the mutually different palettes are used for encoding the input data (D1) as a whole, but with regard to the different parts of the input data (D1), a palette used for a given part of the input data (D1) is optionally used or reused for one or more other parts of the input data (D1) if, for example, the given part and the one or more other parts have substantially similar content. In other words, a same given palette is optionally used or reused for substantially mutually similar parts of the input data (D1). It will be appreciated that, by employing an expression "substantially mutually similar", it is meant that data content of these parts of the input data (D1) is constructed of similar values in this context. Moreover, optionally, a subset of a given palette is used for two or more different parts of the input data (D1), where data content of the input data (D1) contains many similar values, but some other values are different. In other words, this means that a major part of the data content of the input data (D1) is overlapping between those different parts of the input data (D1).

Moreover, it will be appreciated here that palettes can be used for different types of data, for example, such as image data, video data, audio data, genomic data, measurement data, deoxyribonucleic acid (DNA) data, ribonucleic acid (RNA) data, biometric data, and so forth. As an example, an audio palette can be used to express an amplitude of an audio signal in a given frequency band. However, it will be appreciated that, contemporarily, color (colour) palettes are commonly used for images and videos, and represent an example application of embodiments of the present disclosure. Moreover, it is to be noted that the aforementioned method can be used with master palettes as well as adaptive palettes; for example, reference is herewith made to *Palette (computing)—Wikipedia, the free encyclopedia* (accessed May 8, 2015), URL: http://en.wikipedia.org/wiki/Palette_%28computing%29, which is hereby incorporated by reference in its entirety.

According to an embodiment of the present disclosure, determining the mutually different palettes includes:

(i) selecting, from amongst a plurality of known palettes, a given palette that is suitable for encoding at least one part of the input data (D1); and/or
(ii) creating a new palette for encoding at least one part of the input data (D1).

Optionally, the new palette is selected based upon a rule-based analysis and/or a neural network analysis of the input data (D1), for example based upon earlier palettes that have been employed when encoding earlier data; namely, the neural network is trained on earlier input data (D1) and corresponding selection of palettes to determine when to employ a given example palette. Similarly, the neural network analysis is optionally employed when devising new types of palettes, for example by way of an iterative process, wherein palettes are progressively modified until they are substantially optimal for a part of the input data (D1) to be encoded. Such neural network analysis is optionally executed using contemporary high-speed reduced-instruction-set computing (RISC) processors. An example of a neural network capable of being employed is a feedforward neural network; for example, reference is herewith made to *Feedforward neural network—Wikipedia, the free encyclopedia*, (accessed May 8, 2015), URL: http://en.wikipedia.org/wiki/Feedforward_neural_network, which is hereby incorporated by reference in its entirety.

As an example, the input data (D1) can be received as an 8-bit palette index image using a known palette. Optionally, in this regard, the method includes:
(i) determining whether or not the known palette is suitable for encoding at least one part of the input data (D1);
(ii) utilizing the known palette for that at least one part of the input data (D1) for which the known palette is determined to be suitable; and
(iii) creating one or more new palettes for remaining parts of the input data (D1).

Optionally, in this regard, the method includes employing a Rate Distortion (RD) method for determining whether or not a known palette is suitable for encoding a given part of the input data (D1).

For illustration purposes only, there will now be considered an example of how to determine whether or not a known palette is suitable for encoding a given part of the input data (D1), for example, such as a block or sequence of data (hereinafter referred to as a "data block", for the sake of clarity only). An RD value produced by encoding the data block using the known palette is calculated as a distortion between original data of the data block and corresponding decoded data, incremented by "lambda" times a rate required for palette data and indexed data, wherein the decoded data is reconstructed by using the known palette for each individual original data value and "lambda" is a Lagrange multiplier. Optionally, the distortion between the original data and the decoded data is calculated as a Sum of Absolute Difference (SAD), a Sum of Squared Difference (SSD), or some other difference between the original data and the decoded data. Moreover, optionally, the rate required for the palette data and the indexed data includes all bits that are required for encoding the data block, for example, including bits required for palette selection and optionally bits required for compressed palette delivery from a given encoder to a given decoder, and bits required for encoding the data block using indices of palette entries of the selected palette, for example selected known palette.

If the RD value produced by encoding the data block using the known palette is smaller than RD values produced by encoding the data block using other known or created palettes, or it is smaller than a pre-defined threshold value, then the known palette can be used to encode the data block. Optionally, the pre-defined threshold value depends on a desired quality parameter, for example for controlling whether the encoding is substantially lossless or lossy.

It will be appreciated here that the term "known palette" optionally refers to a generally known palette, or a palette that has been otherwise defined as fixed, or a palette that has been used previously for a same data block or some other data block and that has been indexed for reuse in embodiments of the present disclosure.

Moreover, regardless of whether or not a known palette is suitable, new palettes are optionally generated, either with or without quantization. In such a case, a best alternative, namely a palette to be used for encoding, is selected based upon one or more criteria, for example based upon RD values, or in case of lossless coding, based upon which alternative would require a least amount of bits. It will be appreciated that it is sometimes advantageous to create a new palette and use the new palette, even if the new palette is slightly more inefficient for a particular block or sequence of data, if it is otherwise known that the new palette might be useful in encoding some other block or sequence of data. In other words, sometimes, a palette that is a best alternative for use when encoding data, for example based upon an RD value, is not necessarily selected. Optionally, with regard to the whole input data (D1) to be encoded, it is better to select an alternative palette that does not optimize the RD value of a given data block in question, but results in an optimized encoding solution as a whole or, for example, an alternative that results in faster subsequent decoding of data in a decoder. Moreover, a palette, or a subset of a palette, that is not a best alternative for certain blocks whose content overlaps with other blocks is sometimes, in practice, suitable to be used for using the same palette for them both.

According to an embodiment of the present disclosure, the determining of the mutually different palettes depends upon content and/or type of the input data (D1). Optionally, in this regard, the content and/or the type of the input data (D1) relate to at least one of: color (colour), color (colour) format, data format, video content, audio content, image content, measurement data, genomic data, a statistical parameter of data blocks or data block sizes present in the input data (D1). For example, there are optionally employed different palettes with similar indices that are able to be employed separately, based upon the content of the input data (D1); in such a situation, a palette to be used is optionally selected from amongst the different palettes that are known, or that are created as new, based upon various criteria, as described in the foregoing, and/or using any known method, such as described in; for example, *Pictaculous—a color (colour) palette generator*, (accessed May 8, 2015), URL: http://www.pictaculous.com/, which is hereby incorporated by reference in its entirety. As an example of how size can affect the palette selection, when data blocks are small, typically palettes are also small, whereas when data blocks are large, there can be both large and small palettes.

It will be appreciated here that the determination of the palettes is not always dependent on the content and/or the type of the input data (D1), but is also optionally dependent upon data values or index values. Sometimes, when the palette determination is performed based upon indices of a given palette, information relating to the statistical parameter of data blocks or data block sizes is not required to be delivered separately from a given encoder to a given decoder. However, in another case, the palette determination is performed from the original input data (D1), wherein information relating to the statistical parameter of data blocks or data block sizes is required to be delivered from the given encoder to the given decoder.

According to an embodiment of the present disclosure, the determining of the mutually different palettes depends upon characteristics describing one or more decoders that are to be used for decoding the encoded data (E2). Such characteristics, for example, can be indicative of a usage purpose of a given decoder. This dependence is potentially advantageous for optimization of the encoded data (E2), by utilizing the properties of the given decoder.

According to an embodiment of the present disclosure, the determining of the mutually different palettes is performed on a block-by-block basis, for at least one of: data blocks present in the input data (D1), data blocks derived from the input data (D1) by combining and/or splitting data blocks present in the input data (D1), groups of data blocks. Optionally, in this regard, data partitioning can be implemented by splitting the input data (D1) into data blocks and/or by combining data blocks present in the input data (D1) into groups of data blocks.

Moreover, the data blocks and/or groups of data blocks are determined based upon an encoding of the input data (D1). Optionally, in this regard, a given data block and/or group of data blocks can be described, for example, by using a fixed block size or split/combine bits as described in U.S. Pat. No. 8,675,731 B2 and U.S. Publication No. 2014/0441191 A1, which is hereby incorporated by reference in its entirety, for a given section of the input data (D1) or the entire input data (D1). Thus, boundaries of the data blocks and/or groups of data blocks can be delivered efficiently. In other words, "boundaries" as a term means that the data values inside the block can be known and bordered.

It will be appreciated here that not all individual data blocks require a separate palette to be determined. In other words, a given palette can be used by more than one data block and/or group of data blocks. Optionally, some data blocks might not use a palette at all, for example they are encoded in another manner completely, for example using another type of transformation that is not palette-based.

Moreover, the aforementioned method can be used in combination with multiple mutually different encoding methods and standards. As an example, the aforementioned method can be used with a data block encoder described in U.S. Pat. No. 8,675,731 B2, which is hereby incorporated by reference in its entirety. As another example, the aforementioned method can be used with the Graphics Interchange Format (GIF), the Portable Network Graphics format (PNG) and the like.

As aforementioned, the mutually different palettes are referenced on a block-by-block basis via use of palette selection indices in the encoded data (E2). Thus, the palette selection indices associate the mutually different palettes with their respective parts of the input data (D1) encoded into the encoded data (E2), namely their respective data blocks and/or groups of data blocks. In other words, the mutually different palettes are indicated and delivered from a given encoder to a corresponding given decoder via the use of the palette selection indices.

As an example, different palettes and their respective palette selection indices can be used for different parts of video data, for example, such as video clips, video frames, views, channels, macro blocks, blocks, sections, and so forth.

Optionally, when a pre-defined or previously-used palette is used for encoding a given data block and/or group of data blocks, the used palette is referred to with a palette selection index.

Additionally, optionally, when a new palette is used for encoding a given data block and/or group of data blocks, the new palette is delivered together with the given data block and/or group of data blocks. Optionally, the new palette is then added, for example as a new dynamic palette, and is assigned a palette selection index, so as to enable reuse of the new palette in future. For example, it is occasionally feasible to encode two parts of the input data (D1) using a same palette, thereby reducing the number of palettes, or their identification indices, whose identities or palette information have to be delivered from a given encoder to a given corresponding decoder.

Moreover, optionally, the aforementioned palette selection indices are defined in a following manner, wherein there are at least two palette selection indices employed:
(i) one or more of the palette selection indices are used to indicate different palette delivery and/or compression methods by which associated palettes are being delivered and/or compressed, and/or
(ii) one or more of the palette selection indices are reserved for pre-defined palettes, namely palettes that are generally known, for example, such as "master" palettes or a grayscale palette, and/or
(iii) one or more of the palette selection indices are used for reusable palettes, namely palettes that are used and delivered previously and are referred to for subsequent data blocks and/or groups of data blocks, and/or
(iv) one or more of the palette selection indices are used for palettes that are compressed using different compression methods and that are delivered together with their respective data blocks and/or groups of data blocks to which these palettes belong, and/or
(v) one of the palette selection indices is used to indicate that no palette is used.

It will be appreciated here that a given palette can be either reused for several data blocks or used for only a single data block. Furthermore, it will also be appreciated that it is not necessary to use all different palette selection index alternatives when the input data (D1) is encoded.

Optionally, a given palette selection index is used to describe a given palette that is already known or is delivered separately, for example after another palette selection index that indicates a delivery method used. Optionally, a given palette selection index also expresses that its corresponding palette has been delivered within a header in the encoded data (E2), or can be obtained or retrieved, for example, from a certain server, or from a default server by using a reference index for accessing the palette at the default server.

As an example, 256 palette selection indices can be defined, wherein:
(i) a palette selection index '0' can be used to indicate that no palette is used for a given data block;
(ii) palette selection indices '1' to '15' can be used to indicate palettes, when these palettes are used for encoding data blocks, and to indicate different palette delivery methods and/or palette compression methods by which those palettes are being delivered and/or compressed;
(iii) palette selection indices '16' to '127' can be used to indicate pre-defined palettes, for example, such as fixed static palettes (hereinafter referred to as "fixed palette selection indices"), when these pre-defined palettes are used for encoding data blocks;
(iv) palette selection indices '128' to '254' can be used to indicate dynamic palettes, namely palettes that can be added and/or updated, for example based upon already-delivered palettes (hereinafter referred to as "dynamic palette selection indices"), when these dynamic palettes are used for encoding data blocks; and
(v) a palette selection index '255' is reserved for future use, to enable addition of at least one of: new palettes, new palette delivery methods, new palette compression methods.

Notably, reserving a palette selection index for future use, namely in (d), makes it possible to include more palette selection indices, for example by lengthening the palette selection indices to comprise more than one byte. In such a case, a very large set of different palettes can be utilized, thereby enabling a broad spectrum of data content to be encoded in an efficient manner.

It is to be noted here that the number of different palettes used and their palette selection indices are not limited to a certain number, and can vary depending on the different parts of the input data (D1).

Optionally, different palettes can be used for different contents or for different users or companies. At least some of the fixed static palettes can be content-specific or user-specific or company-specific. Thus, the number of fixed static palettes potentially varies, for example based upon a user, a company and/or a type of the content being processed.

As an example, a particular company could determine its own fixed color (colour) palette containing colors (colours) that exist in its registered logo, which is typically used in documents or images prepared by that particular company. Similarly, a company that sequences genome data could determine a palette that describes groups having resulted for such sequencing efficiently. An advantage of using such company-specific palettes is that these company-specific palettes are not required to be separately delivered or included within the encoded data (E2). Examples of such companies that optionally utilize palettes of their own are, for example, Finnish Hesburger® with its logo with red, white and blue colors (colours) as well as Google® with variety of different logos it uses at its search page. "®" denotes a registered trademark.

Use of specific palettes enables a higher compression ratio or a better reconstruction quality to be achieved for some company-specific or user-specific content. Thus, the fixed static palettes provide a business opportunity to sell fixed palette selection indices.

Moreover, optionally, the fixed static palettes include color (colour) palettes, for example, as described in; for example, *List of color (colour) palettes—Wikipedia, the free encyclopedia*, (accessed May 8, 2015), URL: http://en.wikipedia.org/wiki/List_of_color_palettes, which is hereby incorporated by reference in its entirety.

On the other hand, the dynamic palettes include palettes that have been delivered during the encoding, or have been delivered in previous known encoding sessions. Thus, dynamic palette selection indices enable reuse of already delivered palettes, namely previously-used palettes.

The aforementioned method enables utilization of different palettes for different parts of the input data (D1) by making use of an efficient palette delivery method, for example, as will be described later. These palette delivery methods make it possible to achieve a higher compression ratio, or a better signal-to-noise ratio between the input data (D1) and decoded data (D3) generated from the encoded data (E2) compared to known contemporary methods.

It will be appreciated that the term "palette selection indices" does not refer to the concept of palette indexes used in, for example, color (colour) palettes that indicate an ordinal number of a color (colour) triplet in a given palette, wherein the triplet includes a palette entry in the given palette. Instead, the term "palette selection indices" indicates a palette that is used in encoding of a given data block. The term "palette index" is an index that refers to the ordinal number of a single palette entry in a selected palette. A palette index is utilized in coding a single data value or value combination of a data block.

It is hitherto not known to utilize different palettes for different parts of input data (D1) by using palette selection indices that describe the palettes used for the different parts between a given encoder and a corresponding given decoder. Moreover, in embodiments of the present disclosure, only one palette selection index is used to describe a palette used for a given data block and/or group of data blocks.

Moreover, optionally, the palette selection indices are delivered as they are, for example, in a form a data stream. Alternatively, optionally, the palette selection indices are compressed using at least one entropy-encoding method, prior to delivery. Optionally, in this regard, the at least one entropy-encoding method includes at least one of: Huffman coding, VLC encoding, Range coding, Arithmetic coding, Copy coding; these encoding methods are elucidated at the Wikipedia website that is accessible via TCP/IP Internet. Optionally, the palette selection indices are entropy-coded, and inserted into encoded data of their corresponding data blocks. Alternatively, optionally, the palette selection indices are inserted into a data stream and entropy-coded later, so that the palette selection indices of several or of all the data blocks are entropy-coded at one go.

Moreover, optionally, the palettes are delivered from the given encoder to the given decoder by using one or more data files, or by streaming from the given encoder to the given decoder. Optionally, a palette used for encoding a given data block into an encoded data block is delivered within a header of the encoded data block or within the encoded data block itself.

It will be appreciated that the input data (D1) can be encoded either in an interleaved manner or in a planar format. A planar format potentially results in a relatively simpler data structure in the encoded data (E2), but also potentially requires less computing effort to implement. In contradistinction, the aforementioned interleaved format is potentially more robust to unauthorized eavesdropping of the encoded data (E2), for example in situations where data security is important. Moreover, for example when limited computational resources are available at decoding devices, it is optionally feasible to deliver only a part of the input data (D1) encoded via use of palettes in the encoded data (E2).

Moreover, in some examples, only a part of the input data (D1) is encoded and/or delivered using one or more palettes. As an example, pixel values of a YUV image can be delivered with two data values, wherein a first data value describes a luminance value, namely a data value for the Y channel, and a second data value describes a chrominance value, namely a data value for the U and V channels, along with a palette selection index of a used color (colour) palette. In this example, the luminance value can be delivered with or without a one-dimensional Look-Up Table (1-D LUT). The used color (colour) palette corresponds to two channels, namely the U and V channels, and can also be called a "chroma" palette or a "chrominance" palette. The chrominance palette is particularly beneficial to use with I420 (12 bits per pixel) and I422 (16 bits per pixel) pixel formats, namely "data format", but can also be used, for example, for I444 (24 bits per pixel), BGR, I444A and BGRA pixel formats. The chrominance palette potentially prevents a size of the used color (colour) palette from growing too large, while efficiently compressing redundancy of data of the U and V channels, or alternatively, of I444 or BGR channels in the I444A or BGRA images and/or videos.

Optionally, the LUT and/or the data format to be used are selected during selection of an encoding method to be employed for encoding a given part of the input data (D1). In other words, the encoding method to be employed for an entire data block can be selected, whether that data block contains one channel or multiple channels. The selected encoding method pertains to information about which transformations are to be executed and how the encoding is to be performed. Optionally, in this regard, information about the used LUT and/or the data format is signaled from a given encoder to a given corresponding decoder.

Optionally, the data format used for encoding/compression is able to define the type of palettes that have different amounts of palette indexes and different amount of value groups (namely, palette entries). As an example, a palette index may refer to one of:

(i) a group of three colour values of an RGB palette (for example, where a designation "dfRGBLUT" indicates a corresponding data format);
(ii) a group of four colour values of a BGRA palette (for example, where a designation "dfBGRALUT" indicates a corresponding data format);
(iii) a group of two values, for example luminance and transparency (for example, where a designation "dfYt" indicates a corresponding data format);
(iv) a single value, for example luminance (for example, where a designation "dfY" indicates a corresponding data format); or
(v) a different construct with a different amount of values per palette index.

Additionally, optionally, the data format expresses how many palette entries are there in a given palette. Alternatively, optionally, the count of palette entries is stored and/or signalled as a separate value. As an example, a designation "dfBGRLUT_8 bit" indicates a data format that uses 8 bit indices, namely maximally 256 different palette entries may exist in the palette. As another example, a designation "dfBGRLUT_64" indicates a data format in which the indices that point to the palette entries can be signalled as 64-bit values.

Optionally, the data format includes information about the entropy-coding method. As an example, a designation "dfBGRLUT_Range" indicates that the indices generated by using an LUT for the input data (D1) are compressed using the Range coding method. More optionally, the data format includes information about both the count of entries and the entropy-coding method (for example, such as "dfYALUT_64_Range").

Furthermore, according to an embodiment of the present disclosure, the method includes employing change bits on a block-by-block basis, to express whether or not a palette used for encoding a given data block is changed with respect to a palette used for encoding a preceding data block. If the palette used for encoding the given data block has changed, a palette selection index describing the palette is also delivered for the given data block. Otherwise, if the palette has not changed, no additional information is required to be delivered for the given data block as regards the palette used.

Thus, the information about the used palette is typically expressed only per block, which could be, for example, an init block. This enables reducing, for example minimizing, the amount of information that needs to be delivered. Moreover, optionally, the information about the used palette is delivered in a manner wherein first comes the data format, used for a particular block (for example, an init block), and if a palette is included, the data format (for example, as designated by "dfYLUT", "dfY8ALUT", "dfBGRLUT", "dfBGRALUT" and so on) is then followed by the palette selection index. It will be appreciated that sometimes it is advantageous to combine the information about the selected data format and the information about the used palette, namely the palette selection index, into one piece of information. In such a case, an index '72' could for example be used to indicate that the number of the palette used for a given data block is 72 and that its data format is "dfYLUT". The same index '72' could also be used to indicate that the index data produced for the given data block is entropy-coded by using Range coding.

Moreover, optionally, the change bits are written and/or delivered as a bit string. Optionally, the bit string of the change bits is compressed, for example using range coding with or without entropy modification (EM). In a case where a lot of changes occur or a case where only a few changes occur, a probability of bits '0' and '1' in the bit string are very different, and an associated entropy of bits is small. In both of these cases, the bit string can be compressed efficiently, for example, by using range coding.

Furthermore, there are often situations when a given palette is not already known between a given encoder and a corresponding given decoder. Such palettes are described and delivered from the given encoder to the given decoder.

Optionally, in this regard, the method includes delivering one or more of the mutually different palettes via the encoded data (E2) in a compressed form.

Optionally, in this regard, the method includes compressing the one or more of the mutually different palettes using mutually different compression methods. Optionally, these different compression methods are assigned their own palette selection indices. Such a palette selection index indicates to a given decoder which compression method has been employed for compressing a given palette.

Optionally, in this regard, the method includes employing a palette delivery method that utilizes a most suitable compression method for a given palette. Optionally, the palette delivery method employs a server from where the given palette can be obtained or retrieved. This enables a significant decrease in data size in comparison to conventional methods that describe a given palette with all original palette entry values, and optionally, for all data blocks by using raw interleaved channel data values, for example represented by three bytes for each palette entry of an RGB palette.

According to an embodiment of the present disclosure, the method includes delivering one or more of the mutually different palettes via use of delta values relative to a pre-defined or previously-used palette. In other words, a difference between a used palette and a known palette is delivered instead of the used palette. The use of delta values enables switching between different palettes when encoding the different parts of the input data (D1) into the encoded data (E2).

Moreover, according to an embodiment of the present disclosure, the method includes compressing data representative of at least one palette into compressed palette data in a lossless manner for inclusion into the encoded data (E2), wherein palette entry values of the at least one palette are provided consecutively within the encoded data (E2).

Throughout the present disclosure, the term "palette entry values" indicates one or more values, for example a single value, alternatively for example a plurality of values, inside a palette entry of a given palette, wherein the given palette includes at least two palette entries. Notably, a palette entry of a given palette may include one or more values, depending on how many channels the given palette has. Moreover, a palette entry may include values from different channels, or several consecutive values form one channel.

For a color (colour) palette, values inside a palette entry usually include color (colour) space values or greyscale values. As an example, in a color (colour) palette for the RGB color (colour) space, each palette entry includes three bytes that indicate the R, G and B color (colour) channels of a pixel. Likewise, the one or more values inside a palette entry can include bytes indicating any other conceivable data values that indicate one data value combination (or a single data value) that occurs or could occur in an original image or other types of data.

By "consecutively", it is meant that the palette entry values are provided as consecutive values, without any other values (for example, entry index or data index values) in between. In other words, the palette entry values are included as a coherent chunk of data in the encoded data (E2), namely as consecutive values in the encoded data (E2).

Optionally, in this regard, the method includes generating the compressed palette data by compressing one channel or mutually different channels of a given palette:
(i) in an interleaved format (namely together);
(ii) in a planar format (namely together or separately); or
(iii) in a format that indicates different palette entry values,
    for example as a 1-dimensional look-up-table (1-D LUT),
    for each of the mutually different channels, together with
    availability information indicative of combinations of
    palette entry values used in the given palette.

Throughout the present disclosure, the data representative of the at least one palette includes data of the one channel or mutually different channels of the given palette, and is hereinafter interchangeably referred to as the "palette data", for the sake of convenience only.

Optionally, the method includes generating the compressed palette data pursuant to (i) to (iii) in a dynamically changing format depending upon content and/or data structure present in the input data (D1), during encoding of the input data (D1). For example, in an event that the input data (D1) changes therethrough, for example when streamed, from a video conference with medical specialists to providing corresponding lists of DNA genetic sequences to support the video conference, providing at least two mutually different palettes in a dynamically changing format is capable of providing more efficient encoding of the input data (D1).

According to an embodiment of the present disclosure, the method includes communicating the plurality of symbols via a mutually different communication channel to that employed for communicating the compressed palette data. According to another embodiment, the method includes communicating the plurality of symbols via a mutually similar communication channel to that employed for communicating the compressed palette data.

The aforementioned method can be implemented via a given encoder. Optionally, the compressed palette data is delivered from the given encoder to a corresponding given decoder by using one or more data files, or by streaming from the given encoder to the given decoder. Optionally, the compressed palette data is delivered within a header or within the encoded data (E2).

According to an embodiment of the present disclosure, when compressing in the interleaved format, the method includes employing at least one entropy-encoding method to compress the one channel or mutually different channels in the interleaved format. In the interleaved format, palette entry values of all the mutually different channels of the given palette are compressed together. Optionally, in this regard, the at least one entropy-encoding method is used to compress palette entry values of the mutually different channels in a sequence in which these palette entry values occur in the interleaved format. As an example, the mutually different channels can be compressed using Huffman coding, Variable-Length Coding (VLC), range coding, or via a reference to a database, such as in database coding disclosed in the United Kingdom patent application GB2509055A, which is hereby incorporated by reference in its entirety. Optionally, the encoded data (E2) is also encrypted. Others of these coding methods are described in the Wikipedia database, accessible via TCP/IP Internet.

It is to be noted that information expressed by a single data value inside a palette entry is represented inside a known or signalled value range, which means that a known fixed count of bits is required to store or deliver that single data value. Correspondingly, the count of palette entries in a palette is known or signalled, and therefore, a known fixed amount of bits are required to represent the count of palette entries in the coding of data values.

Notably, palettes can also be compressed, as indeed can the indices that point to the ordinal numbers of the palette entries and that were produced in coding the data blocks of the input data (D1). In this compression process, any conceivable entropy-coding method can be used, and thus, the encoded data (E2) may include variable-length symbols. However, a palette itself produces only fixed-length symbols when the palette is decompressed or when the values are indexed.

According to an embodiment of the present disclosure, when compressing in the planar format, the method includes employing at least one entropy-encoding method to compress the one channel or mutually different channels together or separately. As palette entry values of one channel are typically independent of palette entry values of other channels, the mutually different channels can be compressed as planar channels using optionally different encoding methods.

For a given channel, a suitable entropy-encoding method can be selected based upon an inspection of palette entry values of the given channel. As an example, if the given channel includes large palette entry values that occur repeatedly, VLC or range coding can be used to compress the palette entry values of the given channel. As another example, if the given channel includes small palette entry values that occur sequentially, Delta coding or ODelta coding can be used to compress the palette entry values of the given channel. Herein, the term "Delta coding" refers to a method of storing or transmitting data in a form of differences between sequential data rather than complete data files or data values, while the term "ODelta coding" refers to a differential form of encoding based upon wraparound in a binary or integer counting regime, for example as described in a published United Kingdom patent document GB2528460A (see reference [6]).

Moreover, optionally, when compressing palette data, or other types of data in the planar format, the method includes compressing data of a given channel by using 1-D LUT coding. In the 1-D LUT coding, original palette entry values of the given channel are replaced by palette entry values specified in a 1-D LUT. The 1-D LUT coding is particularly beneficial in a case where the original palette entry values are numbers that are sparsely distributed in the whole dynamic range of the palette entry values, or are not numbers that are replaced by indexing symbols to palette entry index numbers.

Beneficially, the indexes that refer to the ordinal number of palette entries are relatively small as compared to the original palette entry values. It will be appreciated that when the input data (D1) is coded, the indices to the palette entries are referred to. In other words, when a part of the input data (D1) that was encoded using a palette is indicated, then the term "index" refers to the ordinal numbers of the palette entries, and each palette entry is then referred to with an index to that entry during the coding of that part of the input data (D1).

Therefore, optionally, Delta or ODelta coding is used to compress the indexes that refer to ordinal number of the palette entries. As aforementioned, the term "Delta coding" refers to a method of storing or transmitting data in a form of differences between sequential data rather than complete data files, while the term "ODelta coding" refers to a differential form of encoding based upon wraparound in a binary counting regime, for example as described in the aforementioned published United Kingdom patent document GB2528460A.

Moreover, optionally, a total number of different index values is reduced when the 1-D LUT coding is used with linear or non-linear quantization. In this regard, the count of original values or palette entry values is taken into account when optionally quantized and dequantized values for the palette entries are defined for a 1-D LUT, so as to reduce, for example to minimize, distortion due to the quantization. When lossy compression is used, it is beneficial to take into account how much distortion will be caused to the original values or palette entry values when the original palette entry values are replaced with quantized and dequantized versions during reconstruction.

Optionally, in this regard, the method includes optimizing the compression of the data of the given channel by using a Rate Distortion (RD) method. This enables a high compression ratio to be achieved, while also enabling a high quality reconstruction to be achieved when the encoded data (E2) is subsequently decoded at a given decoder. As an example, a squared Euclidean distance can be used to represent the distortion caused by lossy compression of palette data. The compression can then be efficiently optimized by using an RD method, wherein an RD value is calculated as a distortion caused by compression (namely, quantization) added by lambda times a rate required for the compressed palette data and their associated index data (indices that point to the ordinal numbers of the palette entries), wherein "lambda" is a Lagrange multiplier.

It is to be noted here that various different quantization methods can be used when original palette entry values are quantized.

A quantized value of a palette entry for the 1-D LUT can be one of the original data values, or can be any other value that lies inside the range of the original palette entry values, for example an average, a weighted average, a median, or a mode of those palette entry values.

According to an embodiment of the present disclosure, the method includes compressing the mutually different channels by delivering different palette entry values, for example as a 1-D LUT, for each channel (hereinafter referred to as "channel data") separately, and delivering availability information indicative of combinations of palette entry values that are used in the given palette. This is particularly beneficial when the given palette is large, but each channel contains only a few different palette entry values, namely originally or after quantization or using a 1-D LUT.

Throughout the present disclosure, the term "channel data" is meant to refer to data channels, which in a given palette are represented by original or quantized values in a palette entry. If the input data (D1) has only one channel (for example, luminance only, as in a PNG colour type '0'), then a palette entry in a given palette typically has only one original or quantized value. Whereas, if the input data (D1) has three channels, such as for example in RGB, then a palette entry in a given palette typically has three original or quantized values. In this regard, a palette entry of a given palette can describe original or quantized values of one or more colour channels, but typically it expresses the original or quantized values of the one or more colour channels for one pixel.

Optionally, the availability information is represented and delivered by way of at least one of: the ordinal numbers of the used or unused combination alternatives, availability bits. Delivering the availability information is particularly beneficial when all possible combinations of the palette entry values are not available in the given palette.

It will be appreciated that an order of combinations is also defined, so as to enable a given encoder and a corresponding given decoder to create a same palette based upon the channel data and the availability information. Optionally, the order of combinations is pre-defined and fixed. Alternatively, optionally, information indicative of the order of combinations is delivered from the given encoder to the corresponding given decoder.

Moreover, optionally, the order of combinations is changed, so as to further improve the compression of the palette data. It is to be noted here that the order of combinations has a large influence on the compression of the input data (D1). Therefore, when the order of combinations is changed, it is beneficial to take into account both a total number of bits required to deliver the encoded data (E2) and a total number of bits required to deliver the compressed palette data.

Moreover, optionally, if amounts of the used and unused combinations are very different, the availability bits can be compressed by employing, for example, range coding with, namely as symbols, or without, namely as bits or symbols, an Entropy Modifying (EM) encoding method, for example, that is described in U.S. Pat. No. 8,754,791 B1, which is hereby incorporated by reference in its entirety.

Moreover, it will be appreciated that when mutually different channels of a given palette contain different numbers of mutually different values, the number of different values for each channel is delivered separately. Moreover, the amount of availability information (for example, bits or ordinal numbers) depends on a multiplication of the number of different values in each channel. Optionally, in this regard, 1-D LUT coding with quantization is particularly beneficial to use. The 1-D LUT coding can be used with quantization to reduce the number of different values to a smaller number. As a result, the number of possible combinations for the channels of the given palette decreases considerably, which, in turn, reduces the amount of availability information (for example, bits or ordinal numbers) required for describing combinations actually used or unused in the given palette.

In a second aspect, embodiments of the present disclosure provide a method of decoding encoded data (E2) to generate corresponding decoded data (D3), characterized in that the method includes:

determining mutually different palettes that are used for generating mutually different parts of the encoded data (E2) by analyzing information, included within the encoded data (E2), associating the mutually different palettes with their respective parts of the encoded data (E2), wherein the information includes palette selection indices for referencing the mutually different palettes on a block-by-block basis; and employing the mutually different palettes to decode their respective parts of the encoded data (E2) to generate the decoded data (D3).

Optionally, in the method, the palette selection indices indicate at least one of:

(a) a given palette that is used for encoding a data block, and a palette delivery method and/or a palette compression method by which the given palette is being delivered and/or compressed;

(b) a pre-defined palette that is used for encoding a data block;

(c) a dynamic palette that is used for encoding a data block;

(d) reserved for future use, to enable addition of at least one of: new palettes, new palette delivery methods, new palette compression methods.

It will be appreciated here, for example, that the phrase "at least one of" includes any one of (a) to (d) for a first example embodiment, alternatively various combinations of a plurality of (a) to (d) for a second example embodiment.

Additionally, optionally, in the method, one of the palette selection indices indicates that no palette is used for a given data block.

Optionally, the method includes reusing or using a given palette for a plurality of parts of the encoded data (E2) when decoding the encoded data (E2).

As aforementioned, the information includes the palette selection indices for referencing the mutually different palettes on a block-by-block basis. Additionally, optionally, the information includes change bits that express whether or not a palette used for generating a given encoded data block is changed with respect to a palette used for generating a preceding encoded data block.

According to an embodiment of the present disclosure, the method includes receiving one or more of the mutually different palettes via the encoded data (E2) in a compressed form.

According to an embodiment of the present disclosure, the method includes receiving one or more of the mutually different palettes via use of delta values relative to a pre-defined or previously-used palette. The use of delta values enables switching between different palettes when decoding the encoded data (E2) to generate the decoded data (D3).

According to an embodiment of the present disclosure, the method includes decompressing compressed palette data included in the encoded data (E2) to generate at least one palette, palette entry values of the at least one palette being provided consecutively within the encoded data (E2), wherein the compressed palette data is decompressed in a lossless manner.

Optionally, in this regard, the compressed palette data includes one channel or mutually different channels of a given palette that are compressed:

(i) in an interleaved format (namely together);
(ii) in a planar format (namely together or separately); or (iii) in a format that indicates different palette entry values, for example as a 1-dimensional look-up-table (1-D LUT), for each of the mutually different channels, together with availability information indicative of combinations of palette entry values used in the given palette.

Optionally, pursuant to (iii), the availability information is represented by way of at least one of: ordinal numbers of used or unused combinations, bits.

Optionally, the method includes generating decompressed palette data pursuant to (i) to (iii) in a dynamically changing format during decoding of the encoded data (E2).

The aforementioned method can be implemented via a given decoder. Moreover, the aforementioned method can be used in combination with multiple mutually different decoding methods and standards. As an example, the aforementioned method can be used with a data block decoder, for example, that is described in U.S. Pat. No. 8,754,791 B1, which is hereby incorporated by reference in its entirety. As another example, the aforementioned method can be used with GIF, PNG and the like.

Optionally, the compressed palette data is received via one or more data files, or via streaming from a given encoder to the given decoder, or is accessed from a database.

According to an embodiment of the present disclosure, when the one channel or mutually different channels have been compressed in the interleaved format, the method includes employing an inverse of at least one entropy-encoding method that was employed at the given encoder to decompress the compressed palette data. As an example, the compressed palette data can be decompressed using Huffman decoding, variable-length decoding, range decoding, or via a reference to a database, such as in database coding disclosed in the United Kingdom patent application GB2509055A, which is hereby incorporated by reference in its entirety. Others of these decoding methods are described in greater detail in the Wikipedia database, accessible via TCP/IP Internet.

According to an embodiment of the present disclosure, when the one channel or mutually different channels of palette data, or other types of data, have been compressed in the planar format, the method includes employing an inverse of at least one entropy-encoding method that was employed at the given encoder to decompress the compressed palette data.

According to an embodiment of the present disclosure, the method includes generating the given palette from the different palette entry values, for example as a 1-D LUT, for each of the mutually different channels and the availability information indicative of the combinations of palette entry values used in the given palette. Optionally, in this regard, the method includes receiving information indicative of an order of the combinations from the given encoder.

Furthermore, optionally, the generated palette is utilized directly during decoding of the encoded data (E2) to reconstruct the decoded data (D3).

As an example, 8-bit palette indices of an encoded image data are replaced by 24-bit RGB color (colour) values to create a color (colour) image during reconstruction.

As another example, the generated palette is used when the decoded data (D3) is displayed or printed, for example when a display device or a printer device, respectively, supports large palettes or color (colour) look-up-tables (CLUT's). It is to be noted here that a CLUT is conventionally used instead of or together with a color (colour) palette. Typically, a CLUT describes an LUT that enables efficient transformation of used color (colour) index values to true colors (colours) or vice versa.

In a third aspect, embodiments of the present disclosure provide an encoder for encoding input data (D1) to generate corresponding encoded data (E2), wherein the encoder is operable to encode the input data (D1) into a plurality of symbols in the encoded data (E2), wherein the plurality of symbols represent data as defined by a plurality of palettes indicated and/or included in the encoded data (E2), characterized in that:

the encoder is operable to determine mutually different palettes to be used for encoding mutually different parts of the input data (D1);

the encoder is operable to use the mutually different palettes for encoding the mutually different parts of the input data (D1); and the encoder is operable to include, within the encoded data (E2), information associating the mutually different palettes with their respective parts of the input data (D1) encoded into the encoded data (E2), wherein the information includes palette selection indices for referencing the mutually different palettes on a block-by-block basis.

Optionally, the palette selection indices indicate at least one of:
(a) a given palette that is used for encoding a data block, and a palette delivery method and/or a palette compression method by which the given palette is being delivered and/or compressed;
(b) a pre-defined palette that is used for encoding a data block;
(c) a dynamic palette that is used for encoding a data block;
(d) reserved for future use, to enable addition of at least one of: new palettes, new palette delivery methods, new palette compression methods.

It will be appreciated here, for example, that the phrase "at least one of" includes any one of (a) to (d) for a first example embodiment, alternatively various combinations of a plurality of (a) to (d) for a second example embodiment.

Additionally, optionally, one of the palette selection indices indicates that no palette is used for a given data block.

Optionally, the encoder is operable to reuse or use a given palette for a plurality of parts of the input data (D1) when encoding the input data (D1), as described earlier.

According to an embodiment of the present disclosure, when determining the mutually different palettes, the encoder is operable to:
(i) select, from amongst a plurality of known palettes, a given palette that is suitable for encoding at least one part of the input data (D1); and/or
(ii) create a new palette for encoding at least one part of the input data (D1).

Moreover, according to an embodiment of the present disclosure, the encoder is operable to employ an RD method to determine whether or not a known palette is suitable for encoding a given part of the input data (D1), as described earlier.

Moreover, regardless of whether or not a known palette is suitable, new palettes are optionally generated, either with or without quantization. In such a case, a best alternative, namely a palette to be used for encoding, is selected based upon one or more criteria, for example based upon RD values, or in case of lossless coding, based upon which alternative would require a least amount of bits.

According to an embodiment of the present disclosure, the encoder is operable to determine the mutually different palettes depending upon content and/or type of the input data (D1). Optionally, in this regard, the content and/or the type of the input data (D1) relate to at least one of: color (colour), color (colour) format, data format, video content, audio content, image content, measurement data, genomic data, a statistical parameter of data blocks or data block sizes present in the input data (D1). It will be appreciated here, for example, that the phrase "at least one of" includes any one of listed items for a first example embodiment, alternatively various combinations of a plurality of listed items for a second example embodiment.

According to an embodiment of the present disclosure, the encoder is operable to determine the mutually different palettes depending upon characteristics describing one or more decoders that are to be used for decoding the encoded data (E2).

According to an embodiment of the present disclosure, the encoder is operable to determine the mutually different palettes on a block-by-block basis, for at least one of: data blocks present in the input data (D1), data blocks derived from the input data (D1) by combining and/or splitting data blocks present in the input data (D1), groups of data blocks. It will be appreciated here, for example, that the phrase "at least one of" includes any one of listed items for a first example embodiment, alternatively various combinations of a plurality of the listed items for a second example embodiment.

Moreover, the data blocks and/or groups of data blocks are determined based upon an encoding of the input data (D1). Optionally, in this regard, a given data block and/or group of data blocks can be described, for example, by using a fixed block size or split/combine bits, as described in U.S. Pat. No. 8,675,731 B2 and U.S. Publication No. U.S. 2014/0044191 A1, which is hereby incorporated by reference in its entirety, for a given section of the input data (D1) or the entire input data (D1). Thus, boundaries of the data blocks and/or groups of data blocks can be delivered efficiently.

Moreover, the aforementioned encoder can be used together with multiple mutually different encoders. As an example, the aforementioned encoder can be used with a data block encoder, for example, as described in U.S. Pat. No. 8,675,731 B2, which is hereby incorporated by reference in its entirety. As another example, the aforementioned encoder can be used with GIF, PNG and the like.

According to an embodiment of the present disclosure, the encoder is operable to employ change bits on a block-by-block basis, to express whether or not a palette used for encoding a given data block is changed with respect to a palette used for encoding a preceding data block.

Optionally, the encoder is operable to compress a bit string of these change bits, for example using range coding with or without entropy modification (EM), as aforementioned.

According to an embodiment of the present disclosure, the encoder is operable to deliver one or more of the mutually different palettes via the encoded data (E2) in a compressed form. Optionally, in this regard, the encoder is operable to compress the one or more of the mutually different palettes using mutually different compression methods.

According to an embodiment of the present disclosure, the encoder is operable to deliver one or more of the mutually different palettes via use of delta values relative to a pre-defined or previously-used palette.

According to an embodiment of the present disclosure, the encoder is operable to compress data representative of at least one palette into compressed palette data in a lossless manner for inclusion into the encoded data (E2), wherein palette entry values of the at least one palette are provided consecutively within the encoded data (E2).

Optionally, in this regard, the encoder is operable to generate the compressed palette data by compressing one channel or mutually different channels of a given palette:
(i) in an interleaved format (namely together);
(ii) in a planar format (namely together or separately); or
(iii) in a format that indicates different palette entry values, for example as a 1-D LUT, for each of the mutually different channels, together with availability information indicative of combinations of palette entry values used in the given palette.

Optionally, pursuant to (iii), the availability information is represented by way of at least one of: ordinal numbers of used or unused combinations, bits.

Optionally, the encoder is operable to generate the compressed palette data pursuant to (i) to (iii) in a dynamically changing format depending upon content and/or data structure present in the input data (D1), during encoding of the input data (D1).

Optionally, these different compression methods are assigned their own palette selection indices. Such a palette selection index indicates to a given decoder which compression method has been employed for compressing a given palette in respect of generating the encoded data (E2).

Optionally, the encoder is operable to deliver the compressed palette data to a corresponding given decoder by using one or more data files, or by streaming to the given decoder. Optionally, the encoder is operable to deliver the compressed palette data within a header or within the encoded data (E2).

According to an embodiment of the present disclosure, the encoder is operable to communicate the plurality of symbols via a mutually different communication channel to that employed for communicating the compressed palette data. According to another embodiment, the encoder is operable to communicate the plurality of symbols via a mutually similar communication channel to that employed for communicating the compressed palette data.

According to an embodiment of the present disclosure, when compressing in the interleaved format, the encoder is operable to employ at least one entropy-encoding method to compress the one channel or mutually different channels in the interleaved format. Optionally, in this regard, the encoder is operable to use the at least one entropy-encoding method to compress palette entry values of the mutually different channels in a sequence in which these palette entry values occur in the interleaved format. As an example, the encoder is operable to compress the mutually different channels using Huffman coding, VLC, range coding, or via a reference to a database, such as in database coding disclosed in the United Kingdom patent application GB2509055A.

According to an embodiment of the present disclosure, when compressing in the planar format, the encoder is operable to employ at least one entropy-encoding method to compress the one channel or mutually different channels together or separately, as described earlier.

Moreover, optionally, the encoder is operable to compress data of a given channel by using 1-D LUT coding, as described earlier. Optionally, in this regard, the encoder is operable to optimize the compression of the data of the given channel by using a rate distortion method.

According to an embodiment of the present disclosure, the encoder is operable to compress the palette data by delivering different palette entry values, for example as a 1-D LUT, for each channel separately, and delivering availability information indicative of combinations of palette entry values that are used in the given palette. This is particularly beneficial when the given palette is large, but each channel contains only a few different palette entry values, namely originally or after quantization or using a 1-D LUT.

Delivering the availability information is particularly beneficial when all possible combinations of the palette entry values are not available in the given palette.

It will be appreciated that an order of combinations is also defined, so as to enable the encoder and a corresponding decoder to create a same palette based upon the channel data and the availability information. Optionally, the order of combinations is pre-defined and fixed. Alternatively, optionally, information indicative of the order of combinations is delivered from the encoder to the corresponding decoder.

In a fourth aspect, embodiments of the present disclosure provide a decoder for decoding encoded data (E2) to generate corresponding decoded data (D3), characterized in that:

the decoder is operable to determine mutually different palettes that are used for generating mutually different parts of the encoded data (E2) by analyzing information, included within the encoded data (E2), associating the mutually different palettes with their respective parts of the encoded data (E2), wherein the information includes palette selection indices for referencing the mutually different palettes on a block-by-block basis; and the decoder is operable to employ the mutually different palettes to decode their respective parts of the encoded data (E2) to generate the decoded data (D3).

Optionally, the palette selection indices indicate at least one of:

(a) a given palette that is used for encoding a data block, and a palette delivery method and/or a palette compression method by which the given palette is being delivered and/or compressed;
(b) a pre-defined palette that is used for encoding a data block;
(c) a dynamic palette that is used for encoding a data block;
(d) reserved for future use, to enable addition of at least one of: new palettes, new palette delivery methods, new palette compression methods.

It will be appreciated here, for example, that the phrase "at least one of" includes any one of (a) to (d) for a first example embodiment, alternatively various combinations of a plurality of (a) to (d) for a second example embodiment.

Additionally, optionally, one of the palette selection indices indicates that no palette is used for a given data block.

Optionally, the decoder is operable to reuse or use a given palette for a plurality of parts of the encoded data (E2) when decoding the encoded data (E2), as described earlier.

Moreover, the aforementioned decoder can be used together with multiple mutually different decoders. As an example, the aforementioned decoder can be used with a data block decoder, for example, as described in U.S. Patent Publication No. 2014/0044191 A1, which is hereby incorporated by reference in its entirety. As another example, the aforementioned decoder can be used with GIF, PNG and the like. GIF and PNG are described in greater detail in the Wikipedia database, accessible via TCP/IP Internet.

According to an embodiment of the present disclosure, the information includes change bits that express whether or not a palette used for generating a given encoded data block is changed with respect to a palette used for generating a preceding encoded data block.

According to an embodiment of the present disclosure, the decoder is operable to receive one or more of the mutually different palettes via the encoded data (E2) in a compressed form.

According to an embodiment of the present disclosure, the decoder is operable to receive one or more of the mutually different palettes via use of delta values relative to a pre-defined or previously-used palette.

According to an embodiment of the present disclosure, the decoder is operable to decompress compressed palette data included in the encoded data (E2) to generate at least one palette, palette entry values of the at least one palette being provided consecutively within the encoded data (E2), wherein the compressed palette data is decompressed in a lossless manner.

Optionally, the compressed palette data includes one channel or mutually different channels of a given palette that are compressed:

(i) in an interleaved format (namely together);
(ii) in a planar format (namely together or separately); or
(iii) in a format that indicates different palette entry values, for example as a 1-D LUT, for each of the mutually different channels, together with availability information indicative of combinations of palette entry values used in the given palette.

Optionally, pursuant to (iii), the availability information is represented by way of at least one of: ordinal numbers of used or unused combinations, bits.

Optionally, the decoder is operable to receive the compressed palette data via one or more data files, or via streaming from a given encoder, or to access the compressed palette data from a database, for example as aforementioned.

Optionally, the decoder is operable to generate decompressed palette data pursuant to (i) to (iii) in a dynamically changing format during decoding of the encoded data (E2).

According to an embodiment of the present disclosure, when the palette data has been compressed in the interleaved format, the decoder is operable to employ an inverse of at least one entropy-encoding method that was employed at a given encoder to decompress the compressed palette data. As an example, the decoder is operable to decompress the compressed palette data using Huffman decoding, variable-length decoding, range decoding, or via a reference to a database, such as in database coding disclosed in the United Kingdom patent application GB2509055A, which is hereby incorporated by reference in its entirety. Such decoding methods are also described in the Wikipedia database, accessible via TCP/IP Internet.

According to an embodiment of the present disclosure, when the palette data has been compressed in the planar format, the decoder is operable to employ an inverse of at least one entropy-encoding method that was employed at the given encoder to decompress the compressed palette data.

According to an embodiment of the present disclosure, the decoder is operable to generate the given palette from the different palette entry values, for example as a 1-D LUT, for each of the mutually different channels and the availability information indicative of the combinations of palette entry values used in the given palette. Optionally, in this regard, the decoder is operable to receive information indicative of an order of the combinations from the given encoder.

In a fifth aspect, embodiments of the present disclosure provide a codec including at least one encoder for encoding input data (D1) to generate corresponding encoded data (E2) pursuant to the aforementioned third aspect, and at least one decoder for decoding the encoded data (E2) to generate corresponding decoded data (D3) pursuant to the aforementioned fourth aspect. Such a codec is, for example, employed in scientific instruments for sensing a given region, for generating the input data (D1), for encoding the input data (D1) to generate corresponding encoded data (E2), for example for storage in data memory of the scientific instruments, and for providing review of the encoded data (E2), for example replay of the encoded data (E2), spatially locally at the scientific instruments. The scientific instruments include, for example medical ultrasonic sensing apparatus, MRI imagers, endoscopic inspection devices, dental X-ray (Röntgen) apparatus, and so forth, but not limited thereto.

An example codec has been provided in conjunction with FIG. 1 as explained in more detail below. The codec includes at least one encoder and at least one decoder.

The at least one encoder employs a method of encoding input data (D1) as described in the foregoing including utilizing mutually different palettes and compression of palette data. The at least one encoder is thus operable to encode the input data (D1) to generate corresponding encoded data (E2).

Moreover, the at least one decoder is operable to perform an inverse of operations executed in the at least one encoder, to decode the encoded data (E2) to generate corresponding decoded data (D3).

Optionally, the codec includes fixed static palettes and dynamic palettes. Optionally, the fixed static palettes are referenced via one or more palette databases, and are downloaded from a dedicated server.

Optionally, the decoded data (D3) is identical to the input data (D1), as in a lossless mode of operation. Alternatively, optionally, the decoded data (D3) is substantially similar to the input data (D1), as in a lossy mode of operation. By "substantially similar" is meant at least 80% similar, more optionally at least 90% similar, and yet more optionally at least 99% similar, wherein such percentage similarity is computed from the number of similar bits being compared relative to a total number of bits being compared. Yet alternatively, optionally, the decoded data (D3) is different to the input data (D1), for example by way of transcoding or via use of one or more transformations, for example, such as a color (colour) conversion, a format conversion, an upscaling conversion, a downscaling conversion, a cropping conversion, a rotation conversion, a flipping conversion, but not limited thereto, but retains substantially similar information present in the input data (D1); for example, the decoded data (D3) is usefully made different to the input data (D1) when reformatting of the decoded data (D3) is also required, for example to be compatible with different types of communication platforms, software layers, communication devices, display devices and so forth.

A color (colour) conversion can be deemed to be optimal for the following reasons:
(i) so as to achieve as good a reconstruction as is possible; and/or
(ii) so as to execute the optimal color (colour) conversion as regards, for example, properties of a display device to be used for presenting the decoded data (D3).

However, an essential issue is the following: if a palette exists that contains values, for example in the RGB color (colour) space, and it is desired to reconstruct an image in the YUV color space, then it is considerably more efficient firstly to transform the palette values from the RGB color (colour) space to the YUV color (colour) space and then to map those YUV values from the transformed palette, than it would be if the values were firstly mapped from the original RGB palette and then a thereby generated image was transformed into the YUV color (colour) space. It will be appreciated that the amount of necessary operations is considerably smaller in the first option here.

The at least one encoder includes a data processing arrangement for processing the input data (D1) to generate the corresponding encoded data (E2) pursuant to embodiments of the present disclosure. Optionally, the data processing arrangement of the at least one encoder is implemented by employing at least one Reduced Instruction Set Computing (RISC) processor that is operable to execute program instructions as elucidated earlier. RISC processors are operable, for example, to implement relatively simple data manipulations at a very great speed, whilst simultaneously utilizing relatively little electrical power, namely a characteristic that is highly advantageous when embodiments of the present disclosure are implemented in mobile battery-powered apparatus, for example "black box" flight recorders for aircraft.

Furthermore, optionally, the at least one encoder is operable to communicate the encoded data (E2) to a data server and/or data storage for storing in a database. The data server and/or data storage is arranged to be accessible to the at least one decoder, which is beneficially compatible with the at least one encoder, for subsequently decoding the encoded data (E2).

In some examples, the at least one decoder is optionally operable to access the encoded data (E2) from the data server and/or data storage.

In alternative examples, the at least one encoder is optionally operable to stream the encoded data (E2) to the at least one decoder, either via a data carrier or a data communication network or via a direct connection. Moreover, it is to be noted that a device equipped with a hardware-based or software-based encoder can also communicate directly with another device equipped with a hardware-based or software-based decoder.

In yet other alternative examples, the at least one decoder is optionally implemented so as to retrieve the encoded data (E2) from a non-transitory (namely non-transient) computer-readable storage medium, such as a hard drive and a Solid-State Drive (SSD).

The at least one decoder includes a data processing arrangement for processing the encoded data (E2) to generate the corresponding decoded data (D3) pursuant to embodiments of the present disclosure. Optionally, the data processing arrangement of the at least one decoder is implemented by employing at least one RISC processor that is operable to execute program instructions as elucidated earlier; such a RISC processor is capable of performing relatively simpler concatenated operations at a very high speed, and is suitable for decoding data provided in a streamed format, for example in real-time. RISC processors are contemporarily employed in smart phones for performing data processing of heterodyned wireless signals at high speed, and enable embodiments of the present disclosure to be conveniently implemented on such smart phones, for example.

Optionally, in this regard, the data processing arrangement of the at least one encoder is operable to execute the aforementioned method of encoding in parallel for different parts of the input data (D1). Correspondingly, optionally, the data processing arrangement of the at least one decoder is operable to execute the aforementioned method of decoding in parallel for different parts of the encoded data (E2), to reconstruct different parts of the decoded data (D3).

When embodiments of the present disclosure are implemented in a multicasting manner, there is a plurality of such decoders that are employed.

Optionally, the codec is implemented within a single device. Alternatively, optionally, the codec is effectively implemented between multiple devices. Optionally, the codec is implemented as custom-design digital hardware, for example via use of one or more Application-Specific Integrated Circuits (ASIC's). Alternatively or additionally, optionally, the codec is implemented using computing hardware that is operable to execute program instructions, for example provided to the computing hardware on a non-transient (non-transitory) machine-readable data carrier.

As an example, the at least one encoder and/or the at least one decoder can be beneficially employed in consumer electronics apparatus, wireless communication apparatus and associated systems, cameras, smart phones, tablet computers, personal computers, scientific measuring apparatus, communications equipments, display devices, videoconferencing equipments, satellites, but not limited thereto.

In a sixth aspect, embodiments of the present disclosure provide a computer program product comprising a non-transitory computer-readable storage medium having computer-readable instructions stored thereon, the computer-readable instructions being executable by a computerized device comprising processing hardware to execute any of the aforementioned methods pursuant to the aforementioned first or second aspects.

Optionally, the computer-readable instructions are downloadable from a software application store, for example, from an "App store" to the computerized device.

Next, embodiments of the present disclosure will be described with reference to figures.

Referring to FIG. 1, embodiments of the present disclosure concern:
(i) an encoder 110 for encoding input data (D1) to generate corresponding encoded data (E2), and corresponding methods of encoding the input data (D1) to generate the encoded data (E2);
(ii) a decoder 120 for decoding the encoded data (E2) to generate corresponding decoded data (D3), and corresponding methods of decoding the encoded data (E2) to generate the decoded data (D3); and
(iii) a codec 130 including a combination of at least one encoder and at least one decoder, for example a combination of the encoder 110 and the decoder 120.

Optionally, in operation, the decoded data (D3) is subjected to processing in a transcoder 140 to produce transcoded decoded data (D4).

Additionally, optionally, in operation, the decoded data (D3) or the transcoded data (D4) is subjected to processing in a scaling unit 150 to produce decoded, transcoded and scaled data (D5).

Optionally, in operation, the encoded data (E2) can be subjected to processing in a scaling and transcoding decoder 121 included in the decoder 120 to produce decoded data; or decoded and scaled data; or decoded and transcoded data (D4); or decoded, transcoded and scaled data (D5).

A left side of FIG. 1 presents an execution path wherein the encoded data (E2) is decoded by the decoder 120 into the decoded data (D3), which is either delivered further as such; or, optionally, first transcoded into new transcoded data (D4), which can be delivered further as such. However, this transcoded data (D4) can optionally be scaled into new transcoded and scaled data (D5). It will be appreciated that the order of the scaling and transcoding procedures can be swapped freely. Moreover, the decoded data (D3) can optionally be scaled only or transcoded only.

A right side of FIG. 1 presents an alternative execution path wherein the encoded data (E2) is fed to a combined scaling and transcoding decoder 121, which is capable of appling decoding, transcoding and scaling of data provided thereto, when necessary. The scaling and transcoding decoder 121 either only decodes the encoded data (E2), or, it decodes the encoded data (E2) and transcodes and/or scales the decoded data into new data (D5), which can be either only decoded, decoded and transcoded, decoded and scaled or decoded, transcoded, and scaled.

FIG. 1 is merely an example, which does not unduly limit the scope of the claims herein. It is to be understood that the specific designation for the codec 130 is provided as an example and is not to be construed as limiting the codec 130 to specific numbers, types, or arrangements of encoders and decoders. A person skilled in the art will recognize many variations, alternatives, and modifications of embodiments of the present disclosure.

Figure 2:
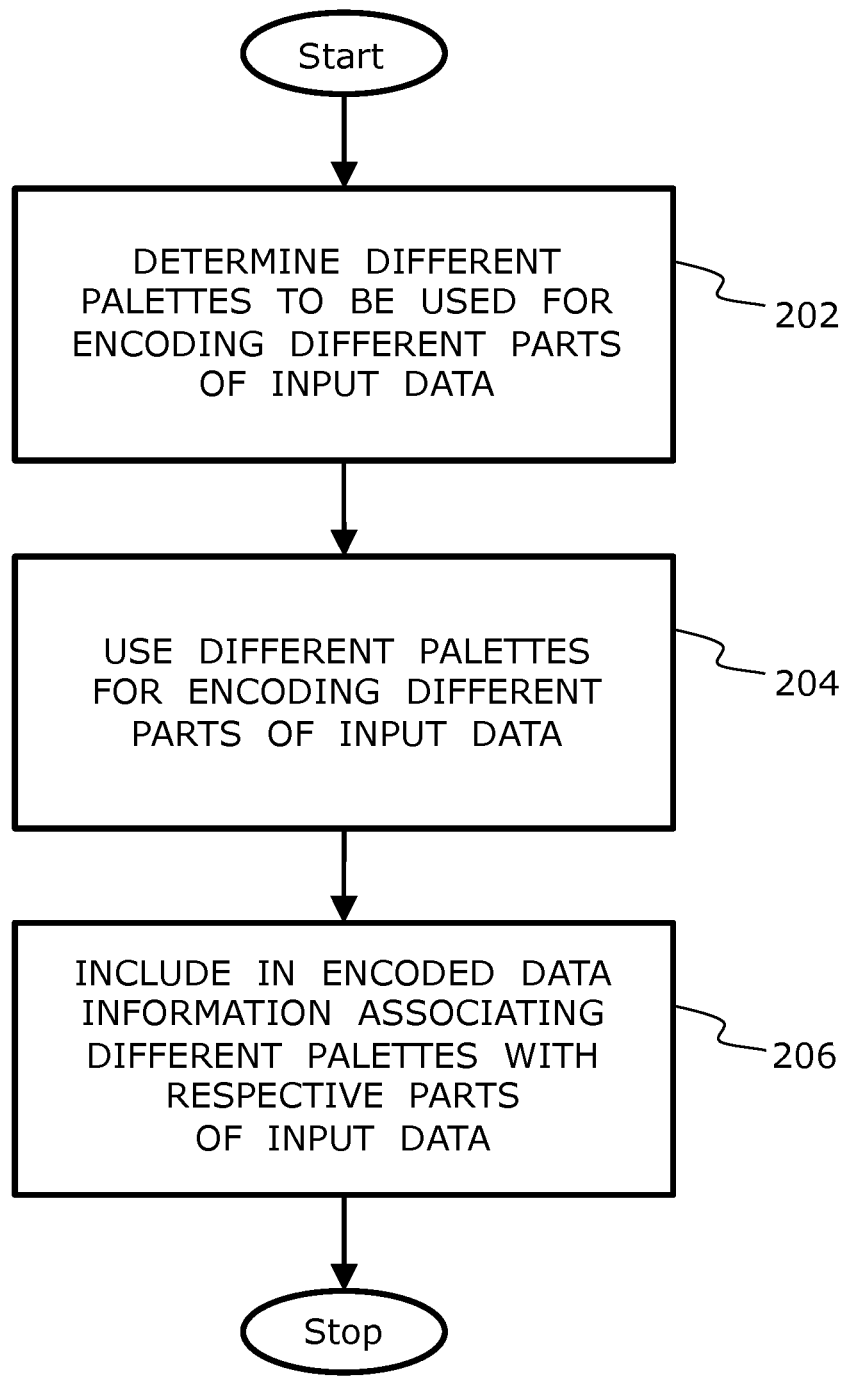
FIG. 2 is a schematic illustration of a flow chart depicting steps of a method of encoding input data (D1) to generate corresponding encoded data (E2), in accordance with an embodiment of the present disclosure.

Referring now to FIG. 2, there is provided a flow chart depicting steps of a method of encoding input data (D1) to generate corresponding encoded data (E2), in accordance with an embodiment of the present disclosure. The method is depicted as a collection of steps in a logical flow diagram, which represents a sequence of steps that can be implemented in hardware, software, or a combination thereof, for example as aforementioned.

At a step 202, mutually different palettes to be used for encoding mutually different parts of the input data (D1) are determined.

At a step 204, the mutually different palettes are used for encoding the mutually different parts of the input data (D1). However, optionally, it will be appreciated that some of the palettes are reused or used for encoding a plurality of parts for which the palettes are suitable.

The step 204 can be executed in parallel for the different parts of the input data (D1), to generate different parts of the encoded data (E2).

At a step 206, information associating the mutually different palettes with their respective parts of the input data (D1) is included within the encoded data (E2). This information includes palette selection indices for referencing the mutually different palettes on a block-by-block basis.

The steps 202 to 206 are only illustrative and other alternatives can also be provided where one or more steps are added, one or more steps are removed, or one or more steps are provided in a different sequence without departing from the scope of the claims herein.

Figure 3:
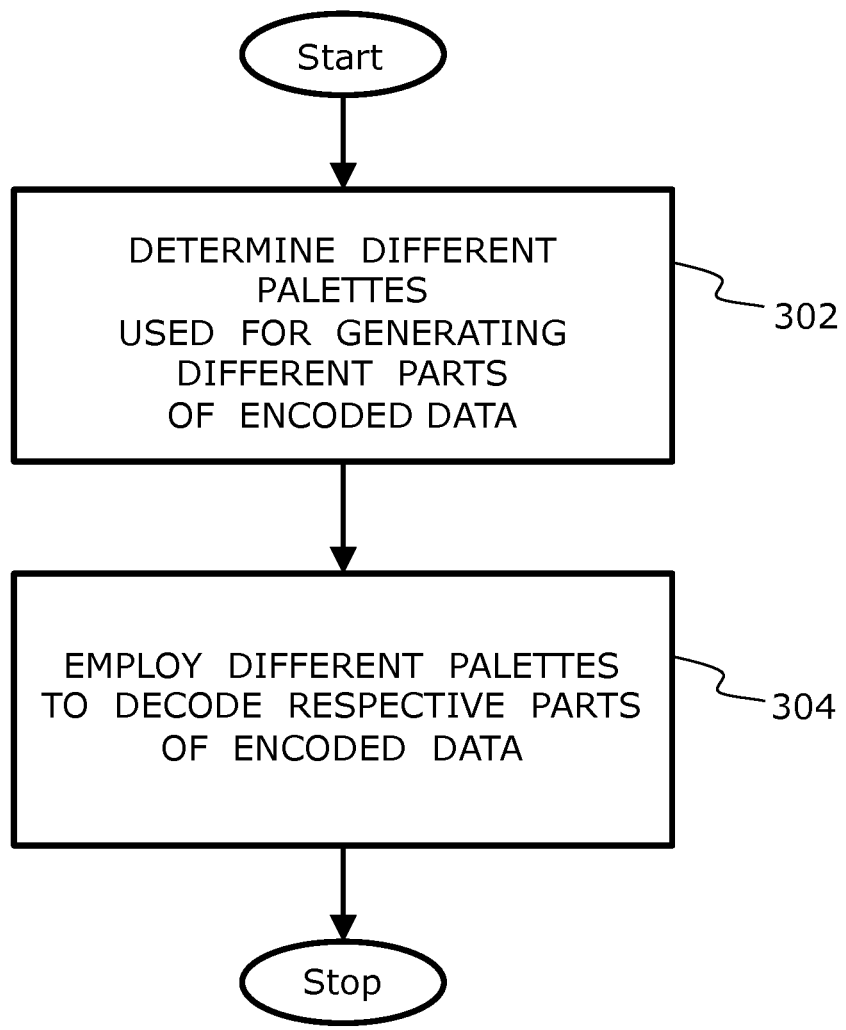
FIG. 3 is a schematic illustration of a flow chart depicting steps of a method of decoding encoded data (E2) to generate corresponding decoded data (D3), in accordance with an embodiment of the present disclosure.

Referring now to FIG. 3, there is provided a flow chart depicting steps of a method of decoding encoded data (E2) to generate corresponding decoded data (D3), in accordance with an embodiment of the present disclosure. The method is depicted as a collection of steps in a logical flow diagram, which represents a sequence of steps that can be implemented in hardware, software, or a combination thereof, for example as aforementioned.

At a step 302, mutually different palettes that are used for generating mutually different parts of the encoded data (E2) are determined by analyzing information, included within the encoded data (E2), associating the mutually different palettes with their respective parts of the encoded data (E2). This information includes palette selection indices for referencing the mutually different palettes on a block-by-block basis.

At a step 304, the mutually different palettes are employed to decode their respective parts of the encoded data (E2) to generate the decoded data (D3).

The step 304 can be executed in parallel for the different parts of the encoded data (E2), to reconstruct different parts of the decoded data (D3).

The steps 302 to 304 are only illustrative and other alternatives can also be provided where one or more steps are added, one or more steps are removed, or one or more steps are provided in a different sequence without departing from the scope of the claims herein.

FIGS. 4A, 4B, 4C, 4D, 4E and 4F are collectively schematic illustrations of an example of a manner in which palettes are determined for a given input data (D1), in this example image data, in accordance with an embodiment of the present disclosure.

In the illustrated example, the image data includes two channels, and therefore, two-channel palettes are employed for encoding the image data. Palette entry values of these two-channel palettes include pairs of values for the two channels (hereinafter referred to as the "value pairs", or "pixels" for the sake of convenience only).

Figure 4A:
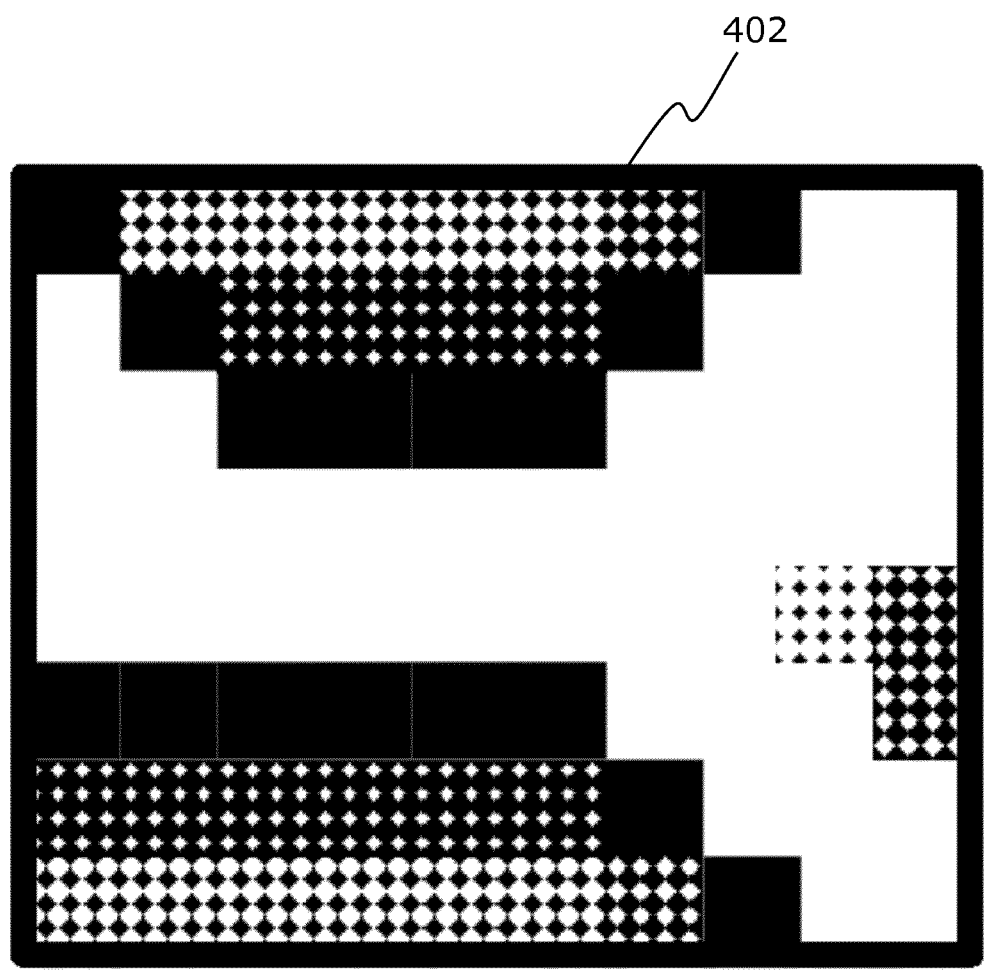

In FIG. 4A, there is shown an image 402 that includes eighty pixels arranged in a 10×8 array.

Pursuant to embodiments of the present disclosure, the image 402 is split into six data blocks, depicted as data blocks 404, 406, 408, 410, 412 and 414 in FIG. 4B. Suitable palettes are then determined for the data blocks 404, 406, 408, 410, 412 and 414.

During encoding of the image data, original value pairs of the pixels of the image 402 are replaced by palette index values using selected palettes.

Thus, a first palette employed for the data block 404 is represented as follows:

| Original Value Pair | Palette Index Value |
| --- | --- |
| (126, 70) | 0 |
| (236, 195) | 1 |
| (145, 168) | 2 |
| (167, 152) | 3 |

A second palette employed for the data block 406 and 414 is represented as follows:

| Original Value Pair | Palette Index Value |
| --- | --- |
| (126, 70) | 0 |
| (236, 195) | 1 |
| (152, 138) | 2 |

A third palette employed for the data block 408 is represented as follows:

| Original Value Pair | Palette Index Value |
| --- | --- |
| (236, 195) | 0 |

A fourth palette employed for the data block 412 is represented as follows:

| Original Value Pair | Palette Index Value |
| --- | --- |
| (145, 168) | 0 |
| (167, 152) | 1 |

With reference to FIG. 4B, the data block 410 is not encoded by use of palettes, and the original value pairs are therefore delivered. The original value pairs of the data block 410 are optionally delivered, for example, as a stream of data as herewith represented:

181, 175, 157, 178, 236, 195, 157, 178

Figure 4C:
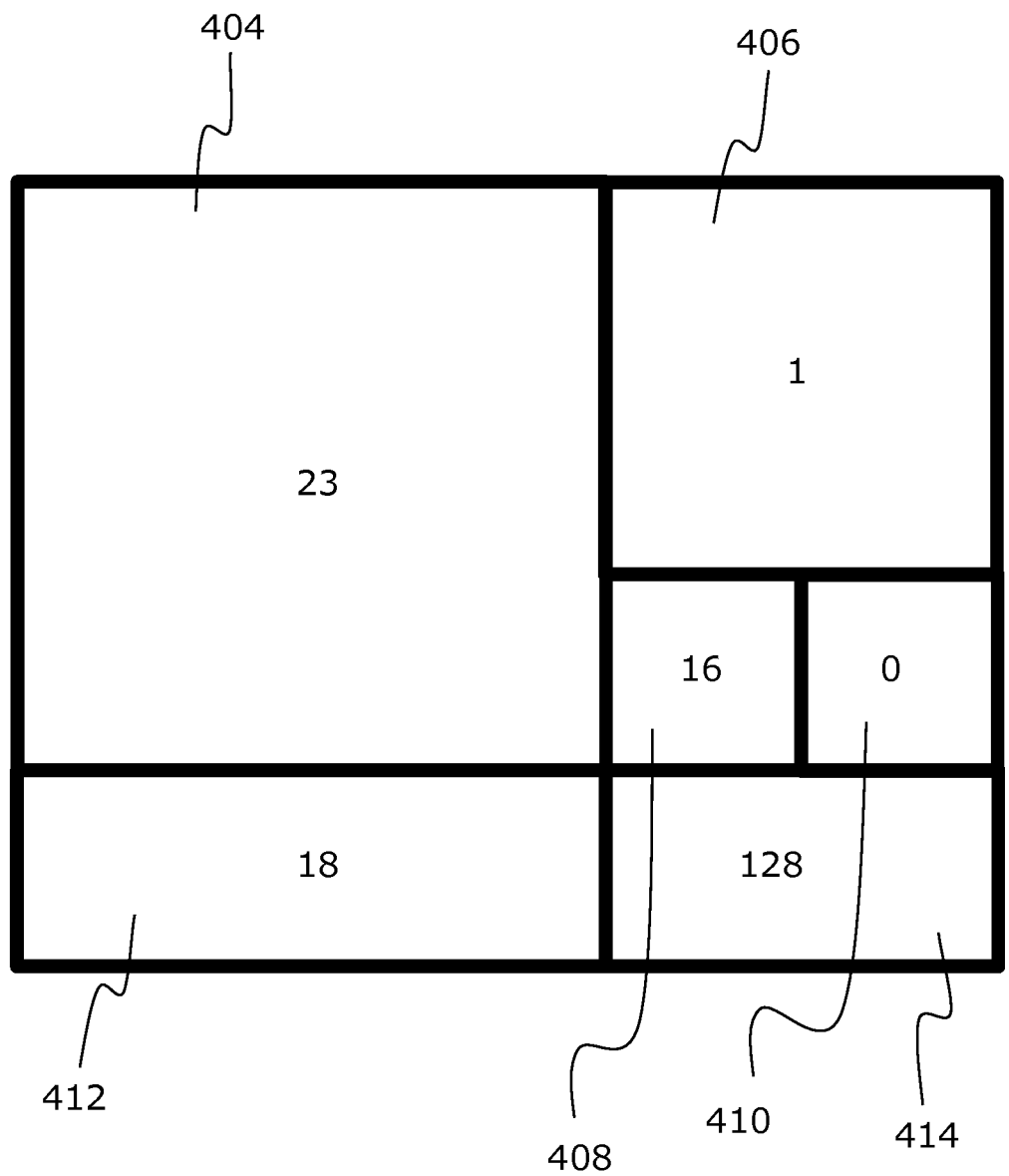

In FIG. 4C, there are shown palette selection indices associated with the data blocks 404, 406, 408, 410, 412 and 414, namely palette selection indices '23', '1', '16', '0', '18', and '128', respectively. These palette selection indices are optionally delivered on a block-by-block basis, for example, as a stream as herewith represented:

23, 1, 16, 0, 18, 128

A table below provides palette selection indices defined for the illustrated example.

| Palette Selection Index | Definition or content of palette |
| --- | --- |
| 0 | No palette |
| 1 | Compression method 1 |
| 2 | Compression method 2 |
| . . . | . . . |
| 15 | Compression method 15 |
| 16 | (236, 195) |
| . . . | . . . |
| 18 | (145, 168), (167, 152) |
| . . . | . . . |
| 23 | (126, 70), (236, 195), (145, 168), (167, 152) |
| . . . | . . . |
| 128 | (126, 70), (236, 195), (152, 138) |

It will be appreciated that the palette selection index '1' corresponding to the data block 406 indicates that the aforementioned second palette employed for the data block 406 has been compressed using a compression method "Compression method 1" into compressed palette data for inclusion into the encoded data (E2). This second palette is then assigned the palette selection index '128', which is used when the second palette is reused for the data block 414. In other words, the second palette is also stored as a dynamic and reusable palette, both at a given encoder and at a given decoder. Both the given encoder and the given decoder then issue to the second palette the first available free dynamic palette selection index, which is the palette selection index '128' in the illustrated example. Next time when the same palette is needed, then it already exists as a dynamic and reusable palette, and therefore, the second palette is then indicated with the palette selection index '128' to indicate reuse of the second palette. This palette selection index '128' is thus the same palette selection index with which the second palette was stored at the given encoder during the delivery and at the given decoder during the reception.

In other words, during subsequent decoding of the encoded data, the second palette is required to be generated by decompressing the compressed palette data only once, and is then reused when required. In other words, the compressed palette data is not required to be decompressed again, for example.

It should be noted that even if there is no same palette selection index used for the plurality of data blocks in the abovementioned example, it is possible to use a same palette selection index for multiple data blocks.

Moreover, the palette index values are optionally delivered on a block-by-block basis, for example, as a stream of data values as herewith represented:

0, 3, 3, 3, 3, 3, 1, 0, 2, 2, 2, 2, 1, 1, 0, 0, 0, 0 . . .

It will be appreciated that a palette or look-up-table (LUT) may contain 1 to N values, wherein 'N' is an integer, which again may be elements consisting of one or more physical data values. For example, RGBA values of a 2×2 block can be described using one palette index, in which case N=16 (4×4); for example, the RGBA values are generated from an imaging sensor, for example a CCD or CMOS sensor, which is directed towards a given scene. The data values of a generic palette can have any conceivable bit depth, for example 1, 2, 4, 8, 16, 24, 32 and so on. A generic palette may contain 1 to M indices, wherein 'M' is an integer, and wherein 'M' is typically a small value, for example less than or equal to a value '256' as in GIF or PNG representations. However, 'M' in the index is optionally used to describe even all the different color (colour) values in the 32-bit data, which would mean that the palette index would be equal to interleaved 32-bit data values, and 'M' thus has a value $2^{32}$. In practice, it is often not appropriate to use such big palettes, and typically the value of 'M' is less than or equal to 65536 (16-bit value), and often it is less than or equal to 256 (8-bit value). The size of the palette is always advantageously selected, based upon how many combinations there are in the data, or can be or needs to be, for example selected depending upon how much data there is to be processed.

In FIG. 4D, there are shown the original value pairs of the eighty pixels of the image 402. For the sake of clarity only, channels of the two-channel palette have been marked as 'A' and 'B' in FIG. 4D.

Encoding the values depicted in FIG. 4D produces the indices depicted in FIG. 4B. During decoding, using the indices depicted in FIG. 4B, and of course also their associated palettes, the pixels of FIG. 4D can be reconstructed, namely the value pairs can be rendered as an image that resembles the image of FIG. 4A.

As regards FIG. 4C, it describes which palette has been used in which section of coding the image, namely it depicts the palette selection indices of the areas of image 402.

Figure 4E:
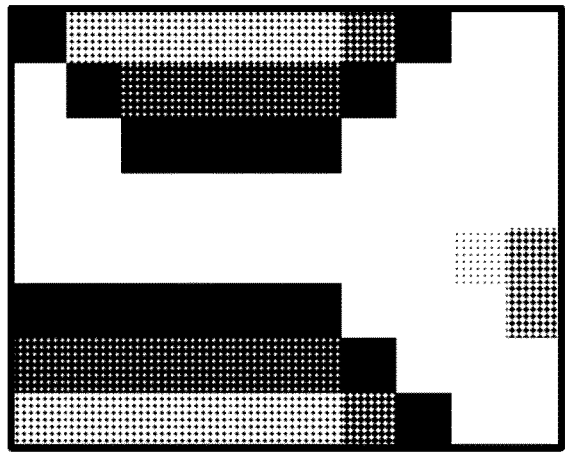
Figure 4E:
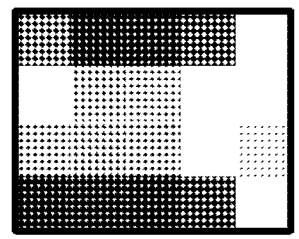
Figure 4E:
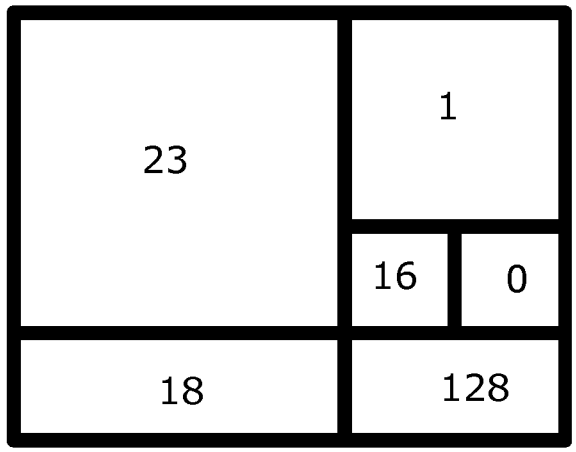

In FIG. 4E, there is shown an example of a scaling procedure, where an original image or block of 10×8 pixels is scaled down to an image or block of 5×4 pixels, whereby the value pairs table depicted in FIG. 4C are scaled down correspondingly. The pixel values of the scaled down image or block are computed so that the two values in a value pair of one pixel in the new scaled-down image or block are the arithmetic mean of a 2×2 sub-block in the original image or block. For example, for the new pixel at the upper left corner of the scaled-down image, the value for the A channel is computed as follows: (126+167+236+126)/4=163.75 which rounds up to 164. The B channel value for that pixel is computed as follows: (70+152+195+70)/4=121.75, which rounds up to 122.

It will be appreciated that scaling cannot be executed by scaling the index values directly, but instead scaled values must be computed from the values that have been constructed after decoding the palette. It should also be noted that any other conceivable scaling method can be used in the scaling unit 150 and in the Scaling and Transcoding Decoder Unit 121 instead of computing the arithmetic mean. It will also be appreciated that a new palette (with 5*4=20 indices) can of course be computed for the new scaled-down 5×4 image, if there were a need to do so, for reuse purposes.

Figure 4F:
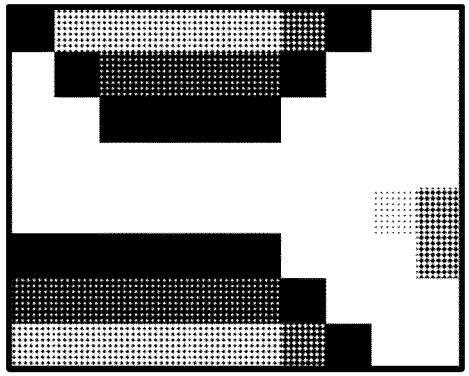
Figure 4F:
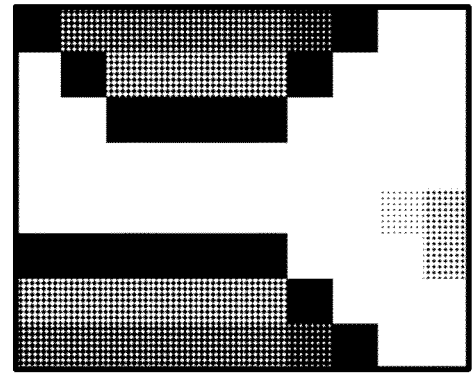

In FIG. 4F, there is shown an example of a transcoding process, wherein the 2-channel image depicted in the upper left corner is transcoded into the new image in the upper right corner by computing for each pixel new values X, using the equation presented below the images as follows X=(2A+B)/3.

Transcoding can always be executed on the decoded data, in which case the index values of the data are first decoded into (renderable) values (namely, value pairs in this example), using a palette to which the indices refer. Those values are then transcoded into a desired format. However, it is often advantageous to execute the transcoding in the following way:

(a) Firstly, the palette entry values (value pairs in this example) are transcoded into the desired format; and (b) Secondly, after that, the decoding of index values of the data is performed by mapping the indices to the palette entries of the new, transcoded palette.

The latter transcoding alternative, namely transcoding the palette, yields the same decoded and transcoded data as transcoding the (renderable) decoded image values, but with far less computing operations needing to be performed.

The new values X are computed only once to a new one-channel palette that can be reused for that image from thereon. The new transcoded palette has the same index values as the 2-channel palette does, thereby enabling easy switching between palettes. It will be appreciated that any other conceivable transcoding method can be used in the transcoding unit 140 and in the Scaling and Transcoding Decoder Unit 121 instead of the formula presented in FIG. 4F.

FIGS. 4A to 4F are merely examples, which do not unduly limit the scope of the claims herein. A person skilled in the art will recognize many variations, alternatives, and modifications of embodiments of the present disclosure.

Figure 5A:
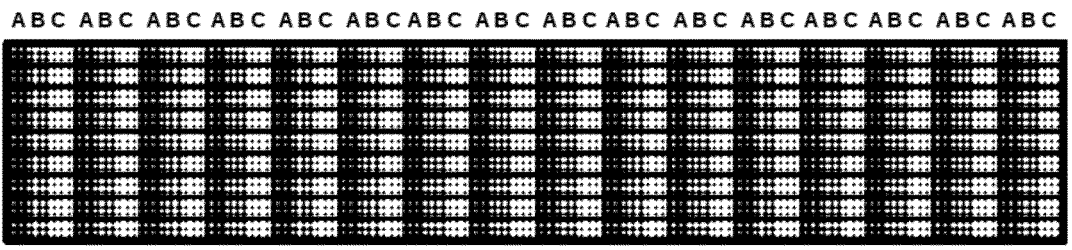
Figure 5B:
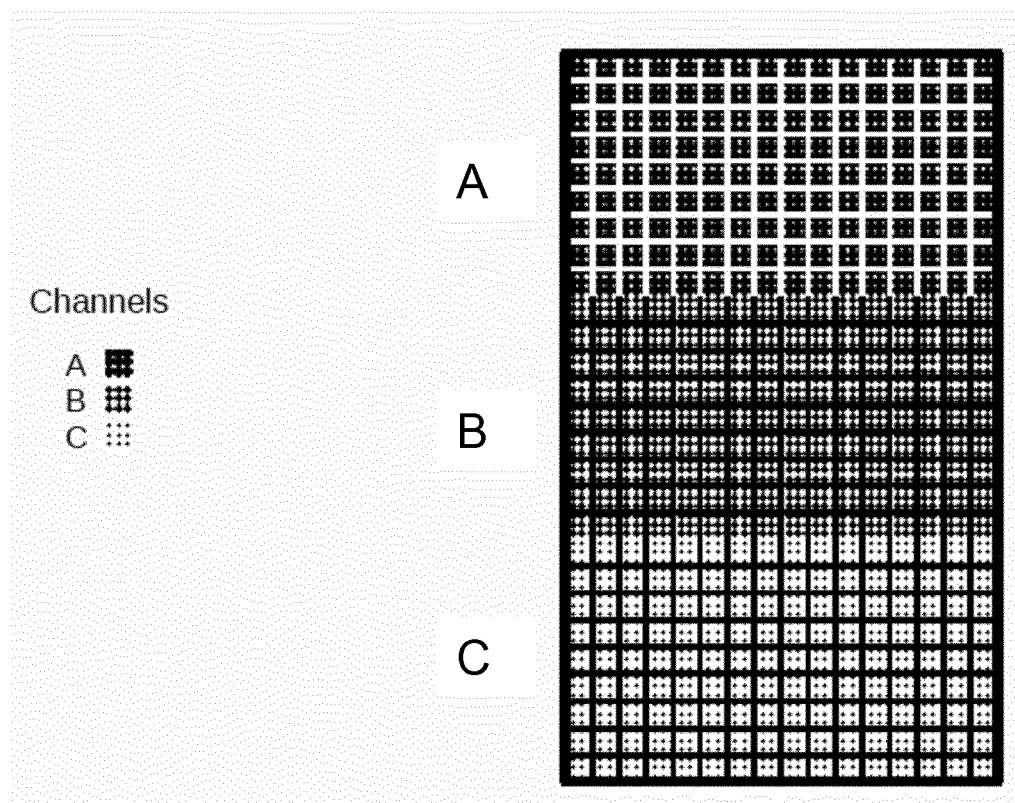
Figure 5C:
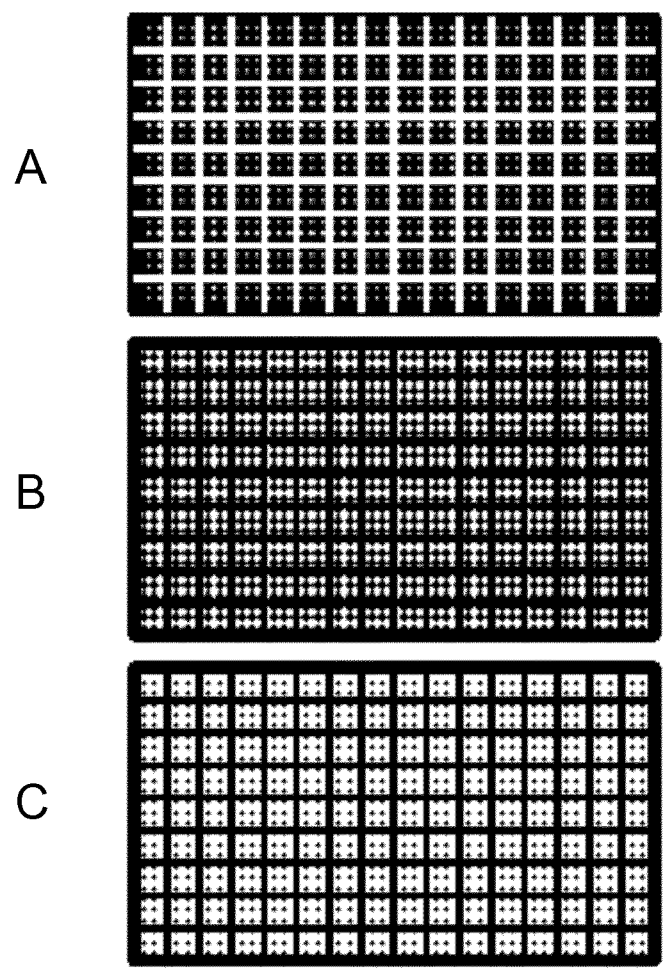

Referring next to FIG. 5A, there is shown an illustration of example data or palette expressed via use of channels A, B and C in an interleaved format, wherein the data or the palette associated with the channels A, B and C are to be compressed mutually together, in accordance with an embodiment of the present disclosure. Moreover, in FIG. 5B, there is shown an illustration of example data or palette expressed via use of channels A, B and C in a planar format, wherein the data or the palette associated with the channels A, B, and C are to be compressed mutually together, in accordance with an embodiment of the present disclosure. Furthermore, in FIG. 5C, there is shown an illustration of example data or palette, wherein the data or the palette associated with the channels A, B and C are in a planar format and are to be compressed mutually separately, in accordance with an embodiment of the present disclosure. The example data represents, for example, image data, audio data, sensor data, genetic data, but not limited thereto.

Figure 6:
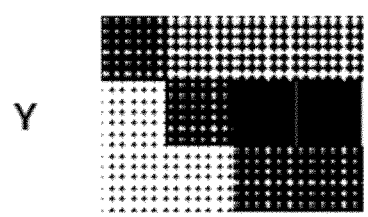
FIG. 6 is an illustration of data that is modified with 1-dimensional (1-D) look-up-table (LUT) for compression, in accordance with an embodiment of the present disclosure.

Referring next to FIG. 6, data denoted by "Y" is, for example, color (colour)-defining data associated with one or more images. When expressed in a planar format, the data "Y" has integer values, as shown, in a range of 71 to 166. The integer values are expressible in a 1-dimensional look-up-table (1-D LUT), having values 71, 97, 102 and 166, which are referenced by index values 0, 1, 2 and 3, respectively. Using the index values, the color (colour)—defining values can also be defined efficiently in a planar format, by using fewer bits, with reference to the 1-D LUT. There is thereby provided an efficient method of encoding the data denoted by "Y", in accordance with an embodiment of the present disclosure.

Figure 7A:
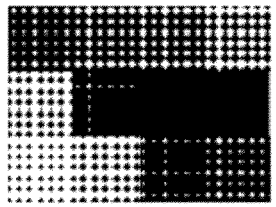
FIGS. 7A, 7B and 7C collectively are an illustration of data, compressed palette based upon the data, the palette, 1-D LUT for each channels and availability bits of different available 1-D LUT value combinations, wherein some of the 1-D LUT value combinations are used in the palette, in accordance with an embodiment of the present disclosure.

In FIG. 7A, an example of representing data to be encoded in an interleaved format for channels A, B and C is shown at bottom and an image is shown at top.

Figure 7B:
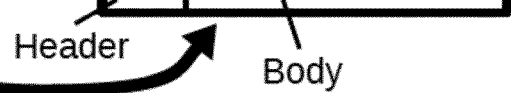

An example of a lossy method of encoding data, which is illustrated in FIG. 7A, is provided in FIG. 7B, in accordance with an embodiment of the present disclosure. Referring next to FIG. 7B, the data to be encoded is represented in three planes associated with channels A, B and C. For the values present in the data to be encoded, it is feasible to generate a lossy palette defined by an index parameter value "I", and values for the channels A, B and C, as illustrated. The palette can, for example, be described by a collection of 1-dimensional look-up-tables (1-D LUT), wherein each of the channels A, B and C has its associated 1-D LUT as shown. By employing the palette and its index parameter values "I", it is feasible to represent the data to be encoded as lossy encoded data, wherein the encoded data includes a header portion that includes compressed palette, denoted by "CP", and a body portion that includes compressed data as compressed index values based upon palette, denoted by "CI". Different portions of CP and/or CI data are optionally further encoded by using entropy encoding methods, for example, such as range coding or VLC coding.

Figure 7C:
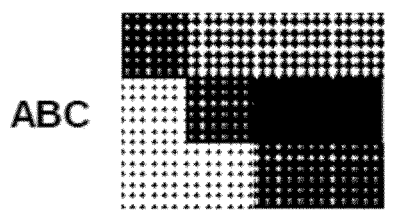

An example of a decoded data generated from the lossy encoded data of FIG. 7B is illustrated in FIG. 7C, wherein the decoded data is represented, for channels A, B and C, in an interleaved format shown at bottom and as an image shown at top.

Methods associated with FIG. 5A to FIG. 7B are usefully employed in an encoder for encoding input data (D1) to generate corresponding encoded data (E2), and an inverse of the methods is usefully employed when decoding the encoded data (E2) to generate corresponding decoded data (D3). One example of decoded data is shown in FIG. 7C. In FIG. 6, two upper images show the data to be encoded and corresponding decoded data as per a lossless mode of operation.

Referring next to FIG. 8A, there is illustrated therein how the 3-D of FIGS. 7A to 7B can be represented by a LUT with three indices 0-3. The indices point to four interleaved A, B, C color (colour) entries.

In FIG. 8B, there is shown in which form the 3-D LUT depicted in FIG. 8A is presented serially to the entropy encoder.

In FIG. 8C, there is shown how necessary header information and the entropy-encoded 3-D LUT are inserted into the encoded data. A header includes the ID of the entropy encoding method, the length of packed or compressed data, the length that the decoded data will have, and the maximum index. After the header, the entropy-encoded data follows.

In FIG. 8D, there is shown a length in bytes of sections of encoded data presented in FIG. 8C. A header has four bytes of which a first byte, defining the entropy encoding method, has a number value 17; a second header byte, defining a length of compressed data, has the number value 5, denoting a length of five bytes; a third header byte, indicating a length of the decoded data (depicted in FIG. 4B) has the number value 12, as in 4×3; a fourth header byte, indicating a maximum index, has a number value 3. After the header, the five bytes of entropy-encoded data follow.

In the aforementioned FIGS. 8A to 8D, there is shown how the data inside a palette is compressed, Referring next to FIGS. 9A to 9C, there is shown therein how the palette is utilized for encoding the data values of the original image, using the indexes that refer to the ordinal numbers of the palette entries.

Referring next to FIG. 9A, there are further shown the palette indices of an image or block with 4×3 pixels. The values of the indices run from '0' to '3', which indicates that there are four palette entries in the given palette, and therefore four different sets of values.

Referring next to FIG. 9B, there is further shown how the values of the indices of the image can be represented in a serial form, with a bit depth set to '2' for the index values. The possible index values are thus '00', '01', '10' and '11'.

Referring next to FIG. 9C, there is shown how the serial form of the used palette indices (12×2 bits) depicted in FIG. 9B can be signalled using only three bytes (24 bits). If the three bytes were to be understood as 8-bit integers, then the values would be 127, 26 and 5. The method used to represent 2-bit index values as bytes is called cmMaxIndexCopy, in which the 2-bit palette indices are inserted one after the other, either MSB (most significant bits) first or LSB (least significant bits) first, so that four 2-bit index values comprise one byte. Executing the cmMaxIndexCopy method reduces the entropy of the index data.

In FIG. 9C, there is further shown how the serial form of the index values depicted in FIG. 9B can be signalled using only three bytes, as compared with twelve bytes required originally. If the three bytes were to be understood as 8-bit integers, then the values would be 127, 26 and 5. The method used to represent 2-bit index values as bytes can, for example, be called "cmMaxIndexCopy", in which the 2-bit index values are inserted one after the other, either Most Significant Byte (MSB) first or Least Significant Byte (LSB) first, in a manner that four 2-bit index values comprise one 8-bit byte. Executing the "cmMaxIndexCopy" method decreases the data size, even though it does not reduce entropy. Therefore, this method can be called an "entropy-coding method", and the same applies also to Range coding or VLC coding. This is because the purpose of entropy-encoding methods is to decrease the data size to approach the entropy inherent in the data. In contrast, the purpose of entropy modifiers is to reduce the entropy of the data, prior to entropy-coding.

Figure 10:
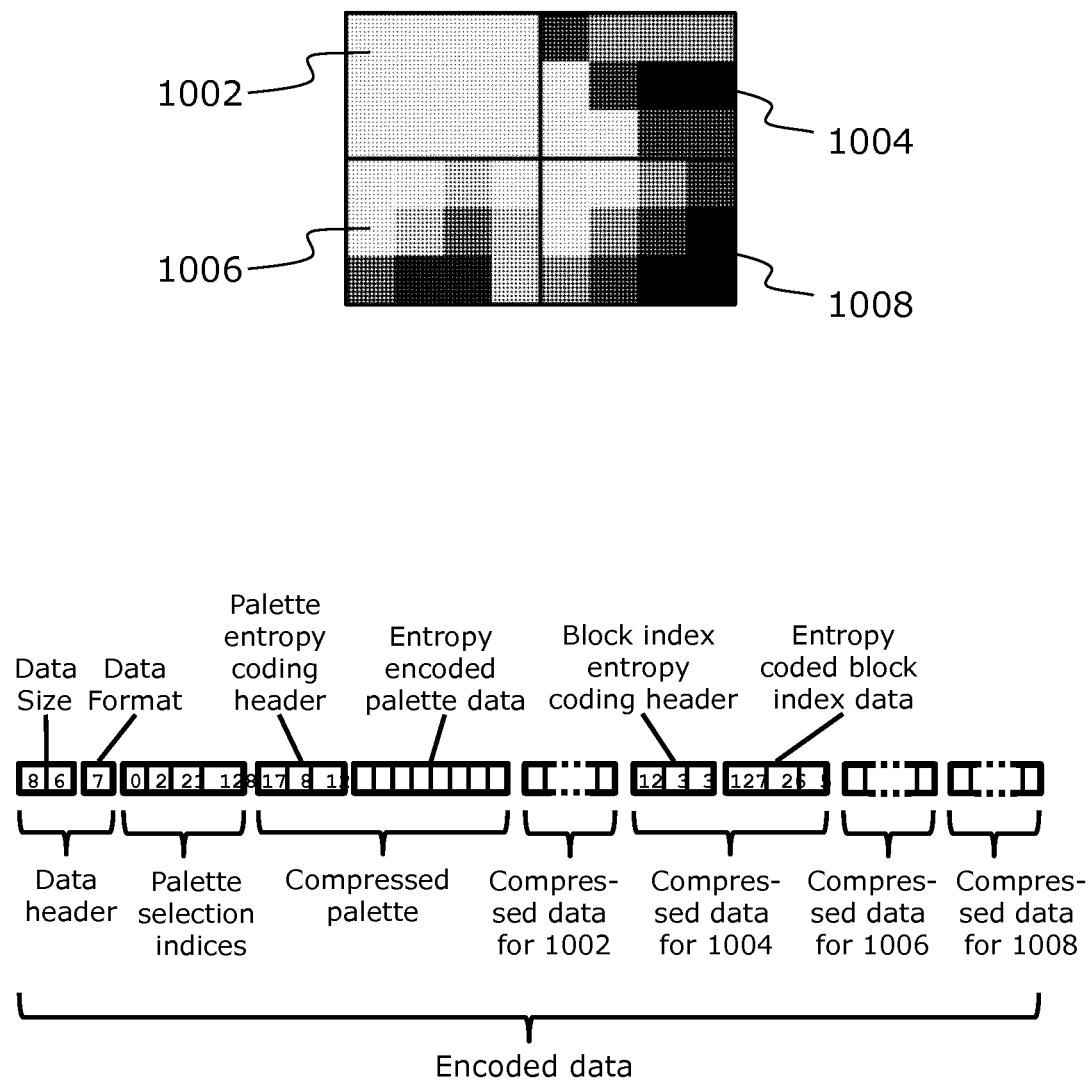
FIG. 10 is an illustration of how encoded data (E2) is assembled and which sections the encoded data (E2) includes.

Referring next to FIG. 10, there is shown an illustration of an example of the composition of encoded data (E2). Only an upper right corner block 1004 of the 4-block image depicted in the upper part of FIG. 10 is explained here in detail; the other blocks are processed correspondingly in operation, and the "Palette selection indices" section that precedes the four chunks of encoded data expresses the index of the palette that was selected in each case, for each block; this is not to be confused with "palette indices" that refer to an order of the entries of each individual palette, and which are compressed and inserted into the encoded data. The block 1004 coincidentally has the same data values and the same dimensions as the image depicted in FIG. 7C.

The main sections of the example encoded data for block 1004 are the data header, the compressed palette and the compressed data. The data header section includes a data size section, wherein the values 4 and 3 refer to the dimensions of the image (4×3), and of a data format section, which is a numeric designation of the format. The compressed palette section is the same example compressed palette whose construction and composition is presented in FIGS. 8A to 8D. The compressed data section is the example compressed palette index data whose construction and composition is illustrated in FIGS. 8A to 8C. The compressed data section contains the entropy-encoded representation for the indices of the palette for block 1004.

Both the palette and its indices have at this stage been separately entropy-encoded and inserted into the encoded data. The overall size of this example encoded data for the block 1004, including headers, is now 3+3+8+3+3=20 bytes.

It will be appreciated that these 20 bytes now express the same image information that needed 4×3×3=36 bytes in FIG. 7C.

FIGS. 5A to 10C are merely examples, which do not unduly limit the scope of the claims herein. A person skilled in the art will recognize many variations, alternatives, and modifications of embodiments of the present disclosure.

In the foregoing, it will be appreciated that expressions such as "at least one of" and "one or more" denote a single item in one example embodiment, and a plurality of items in another example embodiment. Such interpretation is to be employed when understanding the present disclosure, unless another interpretation is explicitly defined.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

We claim:

1. A method of encoding input data to generate corresponding encoded data, the method includes the method including:
    determining different palettes to be used for encoding a plurality of data blocks representing the input data;
    using, for each data block of the plurality of data blocks, a respective subset of the different palettes for encoding the data block; and
    including, within the encoded data, palette selection indices referencing, for each data block of the plurality of data blocks, the respective subset of the different palettes used to encode the data block.

2. The method of claim 1, characterized in that the palette selection indices indicate at least one of:
    (a) one or more palette delivery methods by which the plurality of different palettes are delivered from an encoder to a decoder and/or one or more palette compression methods by which the plurality of different palettes are compressed;
    (b) a pre-defined palette that is used for encoding a data block;
    (c) a dynamic palette that is used for encoding a data block;
    (d) reserved for future use, to enable addition of at least one of: new palettes, new palette delivery methods, new palette compression methods.

3. The method of claim 1, characterized in that the palette selection indices indicate, for a given data block of the plurality of data blocks, that no palette is used for encoding the given data block.

4. The method of claim 1, characterized in that the method includes reusing or using a given palette for multiple data blocks of the input data when encoding the input data.

5. The method of claim 1, characterized in that the method includes employing a Rate Distortion (RD) method to determine whether or not a given palette is suitable for encoding a given data block of the input data.

6. The method of claim 1, characterized in that the determining of the different palettes depends upon content and/or type of the input data, wherein the content and/or the type of the input data relate to at least one of: color, color format, data format, video content, audio content, image content, measurement data, genomic data, a statistical parameter of data parts or data block sizes present in the input data.

7. The method of claim 1, characterized in that the method includes employing change bits on a block-by-block basis, to express whether or not a palette used for encoding a given data block is changed with respect to a palette used for encoding a preceding data block.

8. A method of decoding encoded data to generate corresponding decoded data, characterized in that the method includes:
    determining a plurality of different palettes that are used for generating the encoded data;
    determining, from the encoded data, palette selection indices referencing, for each encoded data block of a plurality of encoded data blocks representing data to be decoded, a respective subset of the plurality of different palettes used to decode the encoded data block; and
    employing, for each encoded data block, the respective subset of the plurality of different palettes to decode the encoded data block and generate a corresponding decoded data block.

9. The method of claim 8, characterized in that the palette selection indices indicate at least one of:
    (a) one or more palette delivery methods by which the plurality of different palettes are delivered from an encoder to a decoder and/or one or more palette compression methods by which the plurality of different palettes are compressed;
    (b) a pre-defined palette that is used for encoding a data block;
    (c) a dynamic palette that is used for encoding a data block;
    (d) reserved for future use, to enable addition of at least one of: new palettes, new palette delivery methods, new palette compression methods.

10. The method of claim 9, characterized in that the palette selection indices indicate, for a given encoded data block of the plurality of encoded data blocks, that no palette is used for the given encoded data block.

11. The method of claim 8, characterized in that the method includes reusing or using a given palette for multiple encoded data blocks of the encoded data when decoding the encoded data.

12. The method of claim 8, characterized in that the information includes change bits that express whether or not a palette used for generating a given encoded data block is changed with respect to a palette used for generating a preceding encoded data block.

13. An encoder for encoding input data to generate corresponding encoded data, wherein the encoder is characterized in that:
    the encoder is operable to determine different palettes to be used for encoding a plurality of data blocks representing the input data;
    the encoder is operable to use, for each data block of the plurality of data blocks, a respective subset of the plurality of different palettes for encoding the data block; and
    the encoder is operable to include, within the encoded data, palette selection indices referencing, for each data block of the plurality of data blocks, the respective subset of the different palettes used to encode the data block.

14. The encoder of claim 13, characterized in that the palette selection indices indicate at least one of:
(a) one or more palette delivery methods by which the plurality of different palettes are delivered from the encoder to a decoder and/or one or more palette compression methods by which the plurality of different palettes are compressed;
(b) a pre-defined palette that is used for encoding a data block;
(c) a dynamic palette that is used for encoding a data block;
(d) reserved for future use, to enable addition of at least one of: new palettes, new palette delivery methods, new palette compression methods.

15. The encoder of claim 14, characterized in that the palette selection indices indicate, for a given data block of the plurality of data blocks, that no palette is used for the given data block.

16. A decoder for decoding encoded data to generate corresponding decoded data, characterized in that:
the decoder is operable to determine a plurality of different palettes that are used for generating the encoded data;
the decoder is operable to determine palette selection indices referencing, for each encoded data block of a plurality of encoded data blocks representing data to be decoded, a respective subset of the plurality of different palettes used to decode the encoded data block; and
the decoder is operable to employ, for each encoded data block, the respective subset of the plurality of different palettes to decode the encoded data block and generate a corresponding decoded data.

17. The decoder of claim 16, characterized in that the palette selection indices indicate at least one of:
(a) one or more palette delivery methods by which the plurality of different palettes are delivered from an encoder to the decoder and/or one or more palette compression methods by which the plurality of palettes are compressed;
(b) a pre-defined palette that is used for encoding a data block;
(c) a dynamic palette that is used for encoding a data block;
(d) reserved for future use, to enable addition of at least one of: new palettes, new palette delivery methods, new palette compression methods.

18. The decoder of claim 17, characterized in that the palette selection indices indicate, for a given encoded data block of the plurality of encoded data blocks, that no palette is used for the given encoded data block.

19. A codec including at least one encoder of claim 13 for encoding input data to generate corresponding encoded data, and at least one decoder of claim 16 for decoding the encoded data to generate corresponding decoded data.

20. A computer program product comprising a non-transitory computer-readable storage medium having computer-readable instructions stored thereon, the computer-readable instructions being executable by a computerized device comprising processing hardware to execute a method comprising:
determining different palettes to be used for encoding a plurality of data blocks representing the input data;
using, for each data block of the plurality of data blocks, a respective subset of the plurality of different palettes for encoding the data block; and
including, within the encoded data, palette selection indices referencing, for each data block of the plurality of data blocks, the respective subset of the different palettes used to encode the data block.

* * * * *